(12) United States Patent
Miyaoka

(10) Patent No.: US 6,246,641 B1
(45) Date of Patent: Jun. 12, 2001

(54) MAGNETO-OPTICAL RECORDING-REPRODUCING METHOD AND APPARATUS UTILIZING DOMAIN WALL DISPLACEMENT

(75) Inventor: Yasuyuki Miyaoka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/162,158

(22) Filed: Sep. 29, 1998

(30) Foreign Application Priority Data

Oct. 1, 1997 (JP) .................................................. 9-268629
Sep. 21, 1998 (JP) ................................................ 10-267060

(51) Int. Cl.[7] ................................................. G11B 11/00
(52) U.S. Cl. ............................................................ 369/13
(58) Field of Search ............................... 369/13, 116, 14, 369/110, 59, 54; 360/59, 114

(56) References Cited

U.S. PATENT DOCUMENTS 5,428,586 * 6/1995 Kobayashi et al. ................ 369/13
5,485,433 * 1/1996 Satomura et al. .................. 369/13
5,629,909 * 5/1997 Shiratori ............................. 369/13
5,796,704   8/1998 Nanba et al. .
5,815,477 * 9/1998 Kimura et al. ..................... 369/50

FOREIGN PATENT DOCUMENTS 0 618 572   10/1994 (EP) .
0 653 749    5/1995 (EP) .
0 686 970   12/1995 (EP) .
0 785 545    7/1997 (EP) .
6-290496    10/1994 (JP) .
8-221760     8/1996 (JP) .

* cited by examiner

Primary Examiner—Tan Dinh
(74) Attorney, Agent, or Firm—Fitzpatrick, Cella, Harper & Scinto

(57) ABSTRACT

Disclosed herein is a magneto-optical recording-reproducing method, wherein a domain wall of a record mark is displaced on a recording medium, thereby conducting the reproduction of information, the method comprising the steps of reproducing the prescribed record signals recorded in the recording medium by plural stages of reproduction power to detect reproduction signals; differentiating the reproduction signals to detect differential signals; and determining the reproduction power on the basis of the amplitude values of the differential signals.

7 Claims, 16 Drawing Sheets

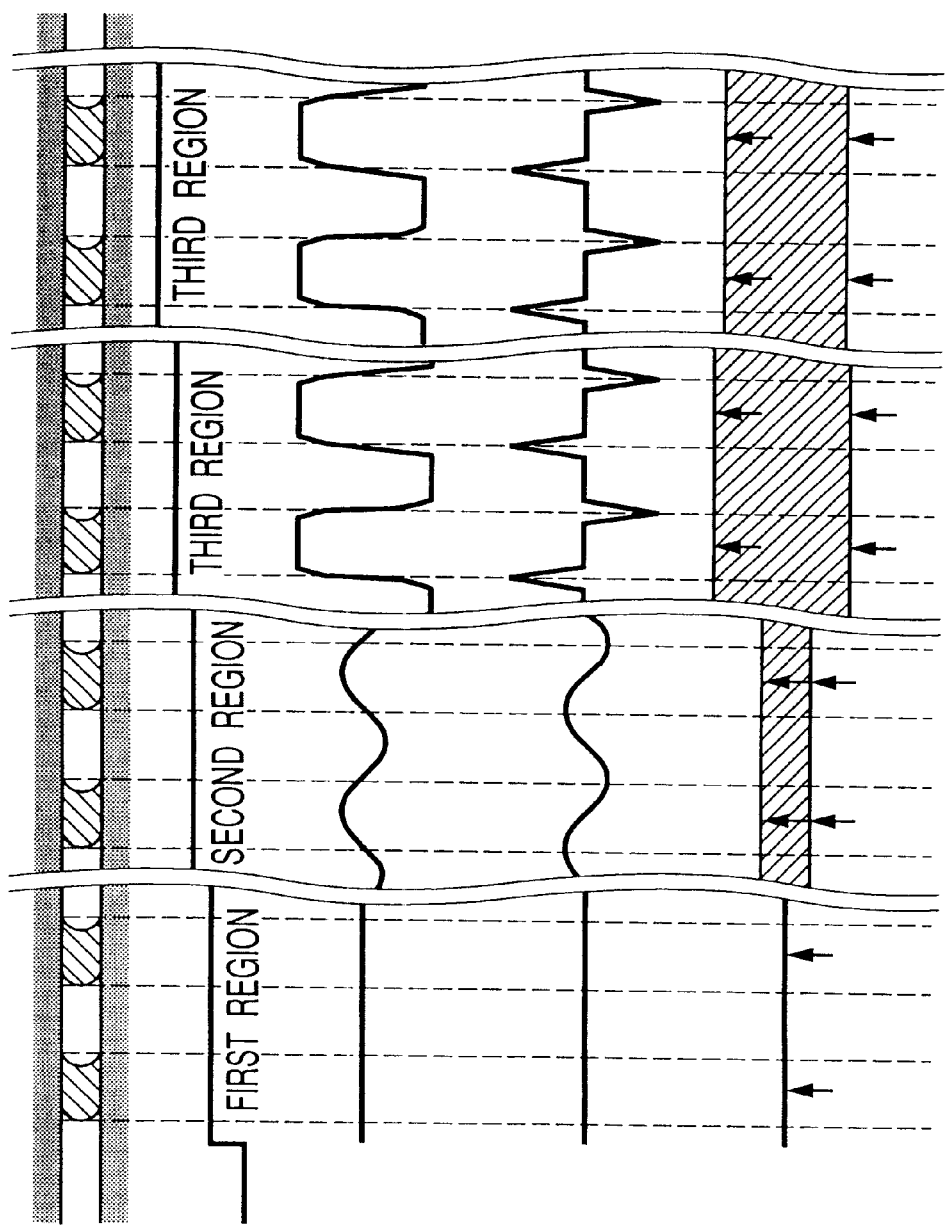

REPRODUCTION SIGNAL

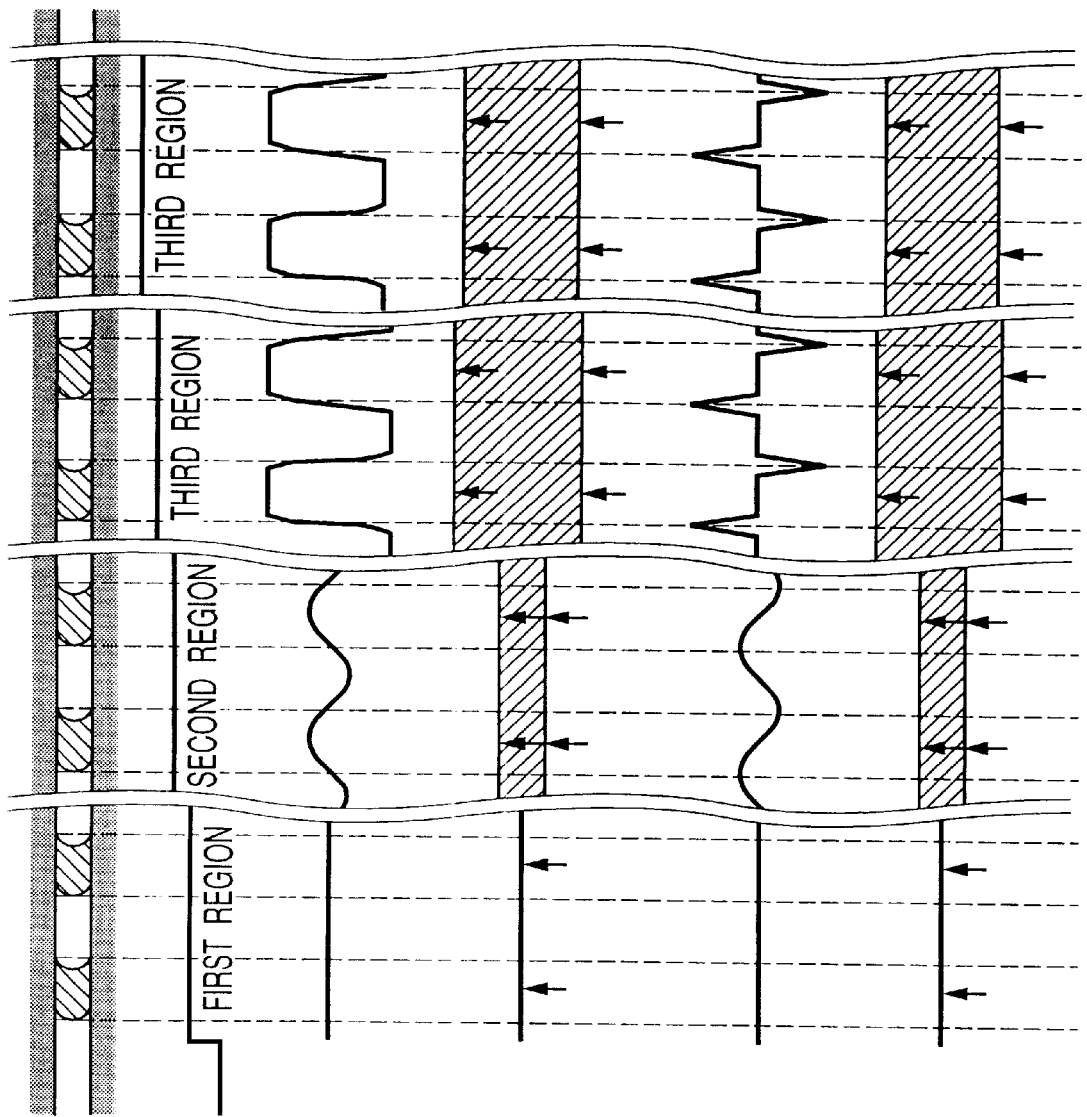

FIG. 11

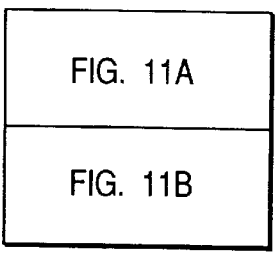

FIG. 11A $V_{d-N}$ : VALUE OF DIFFERENTIAL SIGNAL AMPLITUDE AT N-th MEASUREMENT $V_{zero}$ : CONFIRMING CONDITION OF START OF DOMAIN WALL DISPLACEMENT $V_{d-max}$ : MAXIMUM VALUE OF DIFFERENTIAL SIGNAL AMPLITUDE FROM AMONG N-1 TIMES $\Delta V_{d-s}$ : DECISION VALUE OF DECREASED AMOUNT FROM MAXIMUM VALUE OF DIFFERENTIAL SIGNALS $V_N$ : VALUE OF REPRODUCTION SIGNAL AMPLITUDE AT N-th MEASUREMENT $V_{max}$ : N FOR MAXIMUM VALUE OF REPRODUCTION SIGNAL AMPLITUDE $V_{test}$ : NUMBER OF REPEATING REPRODUCTION TEST

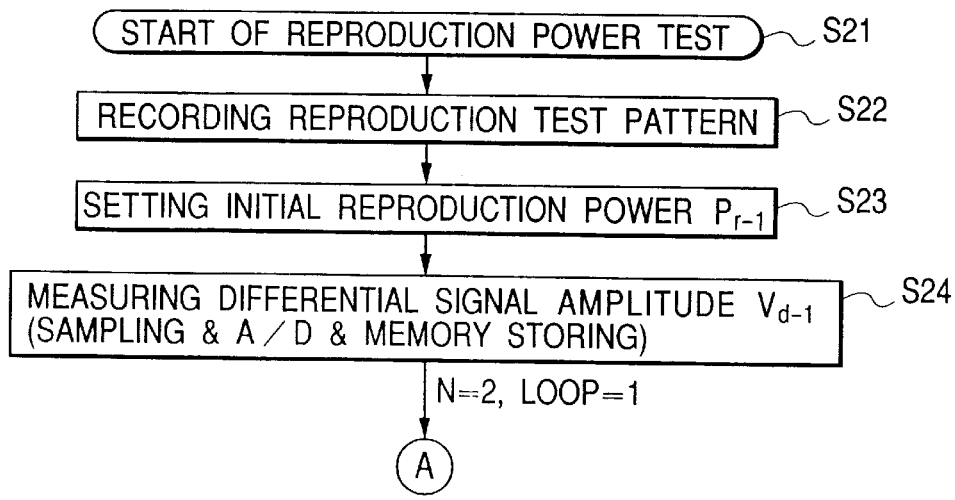

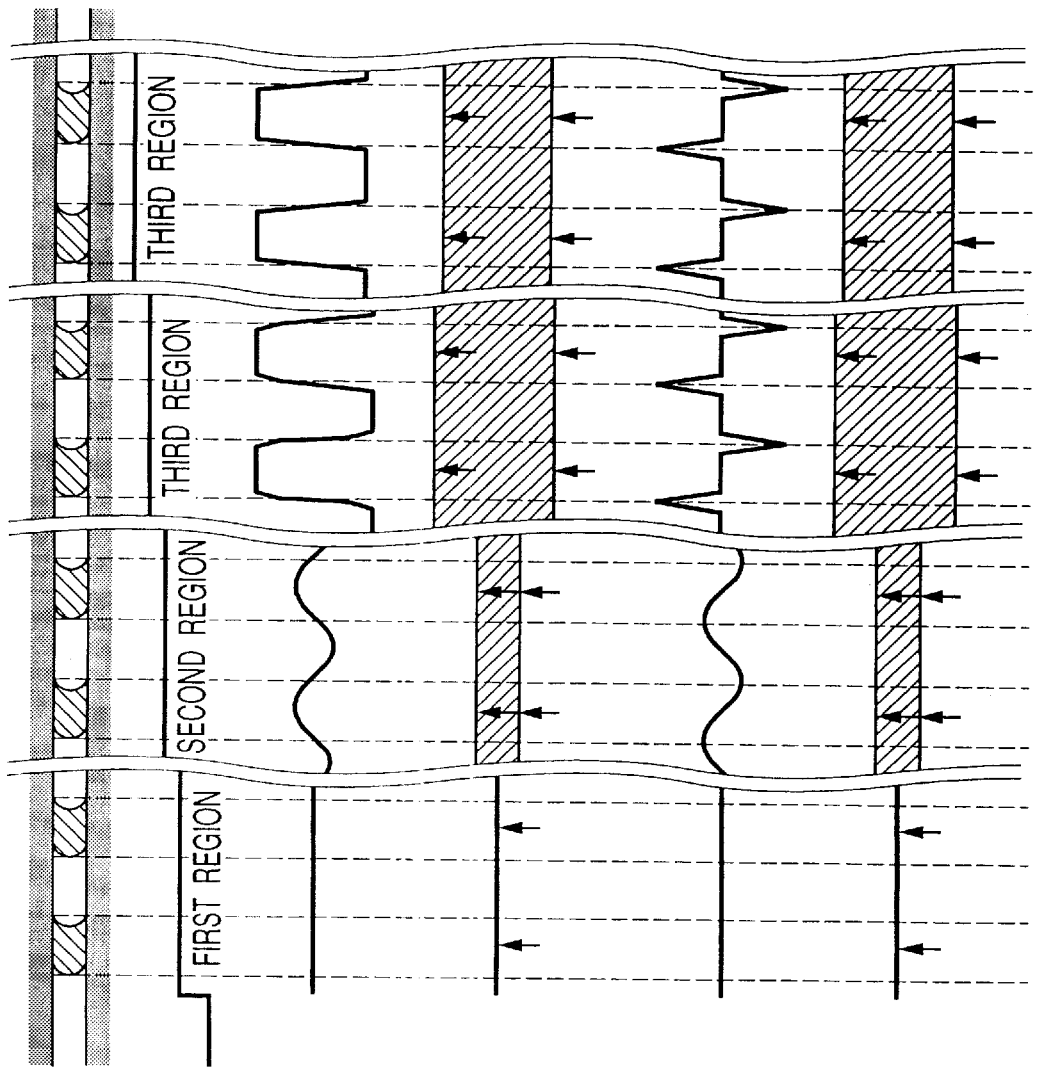

FIG. 14

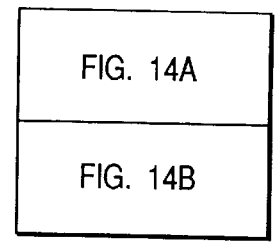

FIG. 14A $V_{d-N}$: VALUE OF DIFFERENTIAL SIGNAL AMPLITUDE AT N-th MEASUREMENT $V_{zero}$: CONFIRMING CONDITION OF START OF DOMAIN WALL DISPLACEMENT $V_{d-max}$: MAXIMUM VALUE OF DIFFERENTIAL SIGNAL AMPLITUDE FROM AMONG N-1 TIMES $\Delta V_{d-s}$: DECISION VALUE OF DECREASED AMOUNT FROM MAXIMUM VALUE OF DIFFERENTIAL SIGNALS $V_N$: VALUE OF REPRODUCTION SIGNAL AMPLITUDE AT N-th MEASUREMENT $V_{max}$: N FOR MAXIMUM VALUE OF REPRODUCTION SIGNAL AMPLITUDE $N_k$: N GROUP HAVING MAXIMUM VALUE OF DIFFERENTIAL SIGNAL AMPLITUDE

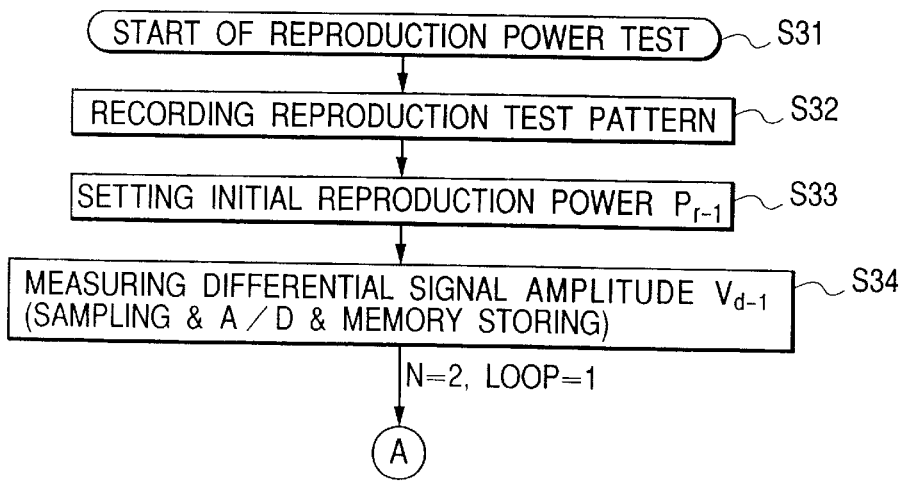

MAGNETO-OPTICAL RECORDING-REPRODUCING METHOD AND APPARATUS UTILIZING DOMAIN WALL DISPLACEMENT

BACKGROUND OF THE INVENTION

1. Field of the Invention

The present invention relates to a magneto-optical recording-reproducing method comprising the steps of (i) forming a record mark on a magneto-optical medium having a multi-layer structure; (ii) irradiating the magneto-optical medium with a light beam; (iii) displacing a domain wall of the record mark in a displacement layer without changing a record data in a memory layer by utilizing a temperature gradient in a temperature distribution caused by the irradiation of the light beam; and (iv) detecting a change in the polarization direction of reflected light of the light beam to reproduce the record mark. The present invention also relates to a magneto-optical recording reproducing apparatus used in such a method.

2. Related Background Art

As a rewritable high-density recording medium, a magneto-optical medium is known in which magnetic domains are formed in a magnetic thin layer thereof by thermal energy of a semiconductor layer to record information, and this information is read out by utilizing a magneto-optical effect. In recent years, there has been a strong demand for further enhancing of the recording density of this magneto-optical medium to provide a recording medium having a greater capacity.

The linear recording density of an optical disk, such as the magneto-optical medium, greatly depends on the laser wavelength and the numerical aperture of an objective lens of a reproducing optical system. More specifically, since the laser wavelength $\lambda$ and the numerical aperture NA of the objective lens of the reproducing optical system determine the diameter of a beam waist, the detectable range of the spatial frequency upon reproduction of a record mark is limited to about $2NA/\lambda$. Therefore, for actually achieving higher recording density with a conventional optical disk, it is necessary to shorten the laser wavelength $\lambda$ or enlarge the NA of the objective lens in the reproducing optical system. However, the improvements in the laser wavelength $\lambda$ and the numerical aperture NA of the objective lens are inherently limited.

Therefore, techniques have been developed where the composition and reading method of a recording medium are devised to improve the recording density.

For example, Japanese Patent Application Laid-Open No. 6-290496 proposes a signal-reproducing method and apparatus therefor, by which signals are recorded in a memory layer of a multi-layer film, having (i) a displacement layer and the memory layer magnetically connected to each other, and (ii) record marks of less than the optical diffraction limit of an optical system which are reproduced by displacing domain walls of record marks in the displacement layer without changing record data in the memory layer. This is done by utilizing a temperature gradient caused by irradiation of a light beam, magnetizing a part of the displacement layer in such a manner that the light beam-spotted region thereof becomes the same magnetization as the corresponding record mark, and detecting a change in the polarization direction of reflected light of the light beam. According to this method, the reproduction signals become rectangular as illustrated in FIG. 2E, so that record marks of frequency of less than the optical diffraction limit can be reproduced without decreasing the amplitude of reproduction signals depending on optical resolving power, whereby the magneto-optical medium and reproducing method can be greatly improved in recording density and transfer speed.

FIG. 1 illustrates an example of the construction of the conventional magneto-optical recording-reproducing apparatus. In FIG. 1, reference numeral 1 indicates a magneto-optical disk comprising a substrate 2 composed of a glass or plastic material, a magneto-optical layer 3 formed on the substrate, and a protective layer 4 formed on the magneto-optical layer 3. The magneto-optical layer 3 has a multi-layer structure comprising a memory layer and a displacement layer and is capable of reproducing record marks of less than the optical diffraction limit of an optical system by displacing a domain wall of a record mark in the displacement layer without changing record data in the memory layer. This is done by utilizing a temperature gradient caused by irradiation of a light beam, enlarging magnetization within the light beam-spotted region of the displacement layer, and detecting a change in the polarization direction of reflected light of the light beam. The magneto-optical disk 1 is set to a spindle motor by a magnet chucking or the like, and is so constructed that it is rotatable on an axis of rotation.

Reference numerals 5 to 13 indicate individual parts that make up an optical head for irradiating the magneto-optical disk 1 with a laser beam and receiving information from reflected light. Specifically, the optical head comprises a condenser lens 6, an actuator 5 for driving the condenser lens 5, a semiconductor laser 7, a collimator lens 8, a beam splitter 9, a $\lambda/2$ plate 10, a polarized light beam splitter 11, photosensors 13 and condenser lenses 12 for the respective photosensors 13. Reference numeral 14 indicates a differential amplification circuit for differentially amplifying signals condensed and detected in the respective polarization directions. The laser beam emitted from the semiconductor laser 7 is projected onto the magneto-optical disk 1 through the collimator lens 8, the beam splitter 9 and the condenser lens 6. At this time, the condenser lens 6 is controlled so as to move in a focusing direction and a tracking direction while under the control of the actuator 5 in response to the detected signals from the photosensor 13 to successively focus the laser beam on the magneto-optical layer 3. This process is constructed so that it tracks along a guiding groove formed in the magneto-optical disk 1.

The laser beam reflected on the magneto-optical disk 1 is deflected by the beam splitter 9 to an optical path toward the polarized light beam splitter 11 and then travels through the $\lambda/2$ plate 10 and the polarized light beam splitter 11. Light beams split by the polarized light beam splitter 11 are condensed by the condenser lenses 12 on the respective photosensor 13 in accordance with the magnetization polarity of the magneto-optical layer 3. The outputs from the respective photosensors 13 are differentially amplified by the differential amplification circuit 14 in order to output magneto-optical reproduction signals.

A controller 16 receives information on the rotational speed of the magneto-optical disk 1, recording radius, recording sectors, and so forth, and outputs recording power, recording signals and the like to control an LD (laser diode) driver 15, a magnetic head driver 18 and the like. The LD driver 15 drives the semiconductor laser 7 and controls the recording power and reproduction power as desired.

Reference numeral 17 indicates a magnetic head for applying a modulation magnetic field to the laser irradiation site on the magneto-optical disk 1 upon the recording operation. The magnetic head is arranged in opposition to the condenser lens 6 with interposition of the magneto-optical disk 1. Upon recording, the semiconductor laser 7 applies recording laser power by irradiation of DC (direct current) light, under the control of the LD driver 15, and synchronously the magnetic head 17 produces magnetic fields of different polarities, under the control of the magnetic head driver 18, in accordance with the recording signals. The magnetic head 17 moves with the optical head in a radius direction of the magneto-optical disk 1, and applies a magnetic field successively upon recording onto the laser irradiation site of the magneto-optical layer 3, thereby recording information.

Guiding groove portions formed in the magneto-optical layer 3, between which respective land portions in a recording region have been formed, are preliminarily annealed at a high temperature by irradiating them with a laser beam of high power. This is done in order to modify the portions of the magneto-optical layer 3 corresponding to the guiding groove portions, so that domain walls of a record mark will not form a closed loop, or a closed magnetic domain. This treatment permits the displacement of the domain walls at a higher speed and the provision of stable reproduction signals.

The recording operation will be described by reference to FIGS. 2A to 2E, in which 2A illustrates recording signals, 2B recording power, 2C a modulation magnetic field, 2D a record mark sequence, and 2E reproduction signals. In recording of the recording signals as illustrated in FIG. 2A, the laser power of the semiconductor laser 7 is controlled with the start of the recording operation so as to give the prescribed level, as illustrated in FIG. 2B, and the modulation magnetic field, as illustrated in FIG. 2C, is applied in accordance with the recording signals, as illustrated in FIG. 2A, by the magnetic head 17. By these operations, the record mark sequence illustrated in FIG. 2D is formed in the course of the cooling of the magneto-optical layer 3. In the record mark sequence illustrated in FIG. 2D, hatching portions and dotted portions respectively indicate magnetic domains different in magnetizing direction from each other.

The reproducing operation will be described by reference to FIGS. 6A to 6D. Herein, a case is described where the magneto-optical layer 3 has a three-layer structure composed of a memory layer for controlling the storage of record marks, a displacement layer in which domain walls are displaced to directly contribute to reproduction signals, and a switching layer for switching the coupling state between the memory layer and the displacement layer.

FIG. 6A typically illustrates the reproduction state of magnetic domains. FIG. 6B illustrates the state of the magneto-optical layer 3 provided between the substrate 2 and the protective layer 4 of the magneto-optical disk 1. FIG. 6C illustrates a state diagram on the temperature of the magneto-optical layer 3. FIG. 6D illustrates reproduction signals. Upon reproduction, the displacement layer of the magneto-optical disk is heated by the irradiation of a light beam, as illustrated in FIG. 6A, up to an isothermal temperature Ts at which the domain wall in the displacement layer is displaced. In a temperature region lower than the isothermal temperature Ts, the switching layer, illustrated in FIG. 6B, is in a state coupled with the memory layer and the displacement layer by exchange-coupling. When the magneto-optical layer is heated to the isothermal temperature or higher by the irradiation of the light beam, the switching layer reaches its Curie temperature, so that the coupling between the displacement layer and the memory layer is broken. Therefore, a domain wall in the displacement layer is momentarily displaced to a position where the domain wall can remain energetically stable relative to the temperature gradient of the displacement layer, namely, to the maximum temperature point in the linear density direction of the temperature rise by the irradiation of the light beam so as to intersect a land. By this displacement, the magnetized state of most of the region covered with the light beam for reproduction becomes the same, so that reproduction signals of a substantially rectangular state, as illustrated in FIG. 6D, can be obtained even from minute record marks which have been unable to be reproduced by the ordinary reproduction principle using the light beam.

Accordingly, such a record mark sequence, as illustrated in FIG. 2D, is reproduced by a light beam whereby reproduction signals, illustrated in FIG. 6D, can be obtained. According to this method, the magnetized state of most of the memory layer and the displacement layer in the region covered with the light beam becomes the same, so that the reproduction signals become substantially rectangular, as illustrated in FIG. 6D. Therefore, record marks of less than the optical diffraction limit can be reproduced substantially without decreasing the amplitude of reproduction signals, whereby a magneto-optical medium and a reproducing method can be provided with great improvements in recording density and transfer speed.

However, the prior art described above has involved a problem that since the quality of the reproduction signals greatly depends on the reproduction power, the signal quality necessary for reproduction cannot be achieved as described below, when it is intended to reproduce information by the reproduction power preset as conventional, and so the reproduction of the information cannot be performed with precision.

In order to reproduce information stored in a magneto-optical layer having a multi-layer structure composed of a memory layer, a displacement layer and the like, on which the present invention is based, it is necessary to heat the magneto-optical layer up to a temperature Ts at which a domain wall in the displacement layer is displaced by irradiation of a light beam. At the same time as the domain wall of a record mark in the magneto-optical layer of the magneto-optical medium is heated to this temperature Ts, as a result of rotation of the magneto-optical disk, the domain wall is displaced to a position where the domain wall can remain stably. In this case, that is a position of the maximum temperature point in the linear density direction of the temperature rise by the irradiation of the light beam, where the domain wall intersects a land, whereby the magnetized state of most of the region covered with the light beam for reproduction becomes the same in a moment, so that reproduction signals undergoing steep polarity changes can be obtained. However, the temperature of the magneto-optical layer raised by the irradiation of the light beam varies according to the intensity of irradiation power of the light beam, the sensitivity to light, atmospheric temperature and transfer speed (linear speed) of the recording medium, and the quality of an optical system by which a light beam is formed.

The behavior of reproduction signals, in the case where the power of a light beam is changed, is described by reference to FIG. 7. FIG. 7 diagrammatically illustrates the dependence of the amplitude of reproduction signals and the amplitude of differential signals of the reproduction signals on reproduction power plotted on an abscissa when record marks of 0.15 μm tone were recorded at a duty of 50%.

As apparent from FIG. 7, no reproduction signal appears in a first region of low reproduction power. In this region, a region of the temperature Ts is not formed at all on the medium, and so the phenomenon of domain wall displacement does not present itself. Therefore, the reproduction signals depend on the resolving power of the optical system like the reproduction of the conventional magneto-optical media. As a result, the record marks of 0.15 μm tone cannot be reproduced due to the resolving power and intercode interference of the optical system.

In a second region in FIG. 7, a region of the temperature Ts starts to be gradually formed on the medium. However, since the region of the temperature Ts is insufficient, and a temperature gradient from the region of the temperature Ts to the maximum temperature point is gentle, the rate of domain wall displacement is also slow, and the polarity change of reproduction signals also becomes gentle, so that sufficient signal quality is not achieved. In this region, influence by the intraperipheral scattering and the like of the medium also presents itself.

In a third region in FIG. 7, a region of the temperature Ts is substantially sufficiently formed on the medium, and a temperature gradient from the region of the temperature Ts to the maximum temperature point becomes steep. Therefore, the rate of the domain wall displacement is also increased, and reproduction signals also come to show a steep change in polarity. Incidentally, in the third region, the reproduction signal carrier starts to decrease due to the increase in the reproduction power. This is mainly due to the fact that the temperature of a portion of the displacement layer contributing to a signal component within a light beam spot is raised by the increase of the reproduction power, and a Kerr rotational angle $\theta_k$ contributing to the amplitude of the reproduction signals is decreased with this temperature rise.

In a fourth region of higher reproduction power, data destruction in the memory layer starts, and so this region cannot be used as a reproduction region.

As apparent from the phenomenon described above, the reproduction waveform is changed to various states according to the intensity of the reproduction power. Therefore, due to the factors such as the sensitivity to light, atmospheric temperature and transfer speed (linear speed) of the recording medium, and the quality of an optical system by which a light beam is formed, it is very difficult to achieve the necessary signal quality by the reproduction power preliminarily specified.

SUMMARY OF THE INVENTION

In view of the above-described problems involved in the prior art, it is an object of the present invention to provide a recording-reproducing method and apparatus comprising reproducing information by displacing domain walls, by which reproduction power capable of reliably obtaining reproduction signals of high quality, can be set with ease.

The above object can be achieved by the present invention described below.

According to the present invention, there is thus provided a magneto-optical recording-reproducing method wherein a domain wall of a record mark is displaced on a recording medium in order to conduct the reproduction of information, the method comprising the steps of:
  reproducing the prescribed record signals recorded in the recording medium by plural stages of reproduction power to detect reproduction signals;
  differentiating the reproduction signals to detect differential signals; and
  determining the reproduction power on the basis of the amplitude values of the differential signals.

According to the present invention, there is also provided a magneto-optical recording-reproducing apparatus wherein a domain wall of a record mark is displaced onto a recording medium in order to conduct the reproduction of information, the apparatus comprising:
  a means for reproducing the prescribed record signals recorded in the recording medium by plural stages of reproduction power to detect reproduction signals;
  a means for differentiating the reproduction signals to detect differential signals; and
  a means for determining the reproduction power on the basis of the amplitude values of the differential signals.

BRIEF DESCRIPTION OF THE DRAWINGS

FIGS. 4A, 4B, 4C, 4D and 4E illustrate timing charts for explaining the operation of the first embodiment of the present invention.

FIGS. 10A, 10B, 10C, 10D, 10E and 10F illustrate timing charts for explaining the operation of the second embodiment of the present invention.

FIGS. 13A, 13B, 13C, 13D, 13E and 13F illustrate timing charts for explaining the operation of a third embodiment of the present invention.

DESCRIPTION OF THE PREFERRED EMBODIMENTS

Figure 1:
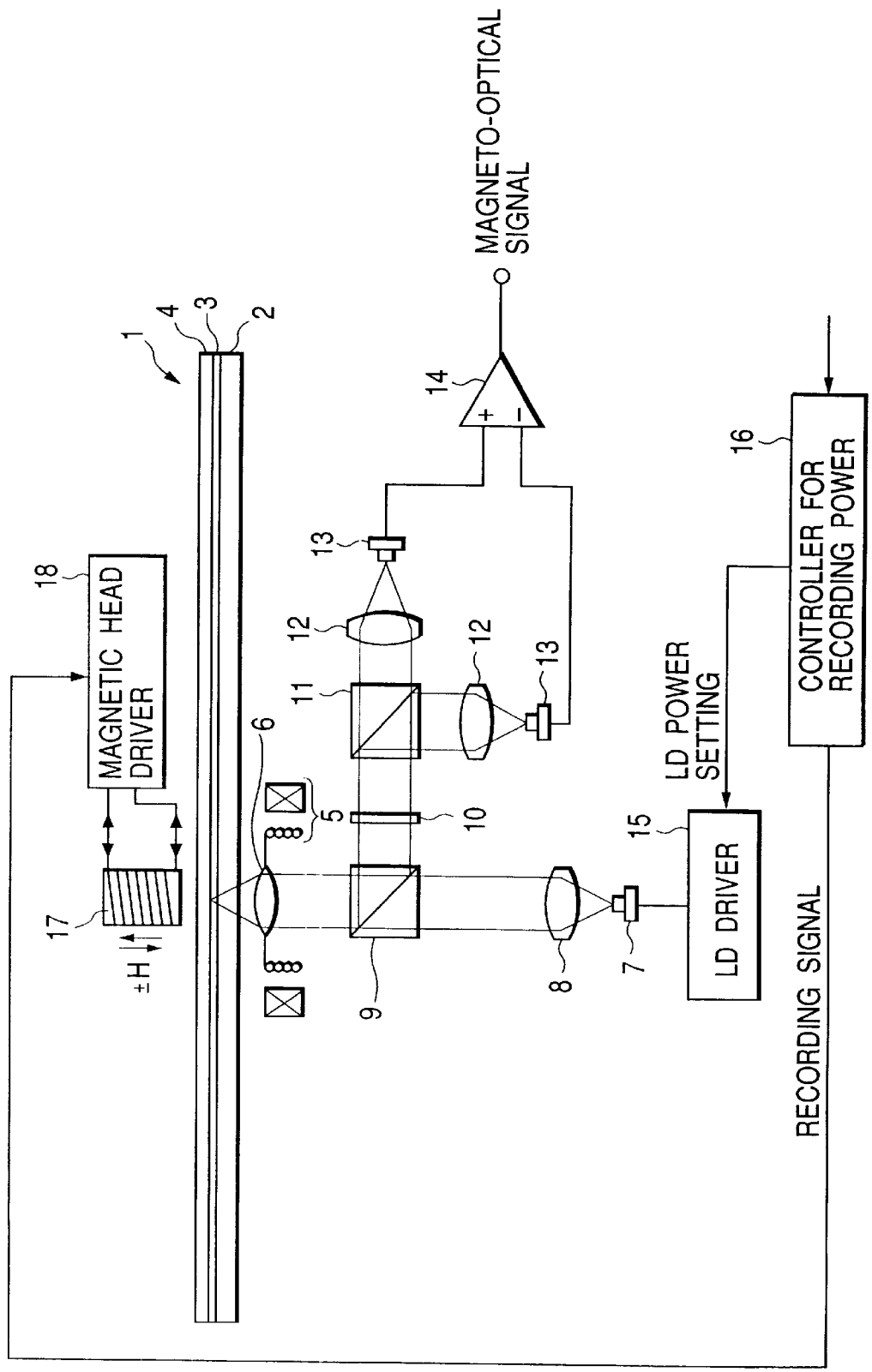
FIG. 1 illustrates the construction of a conventional magneto-optical recording-reproducing apparatus.
Figure 2:
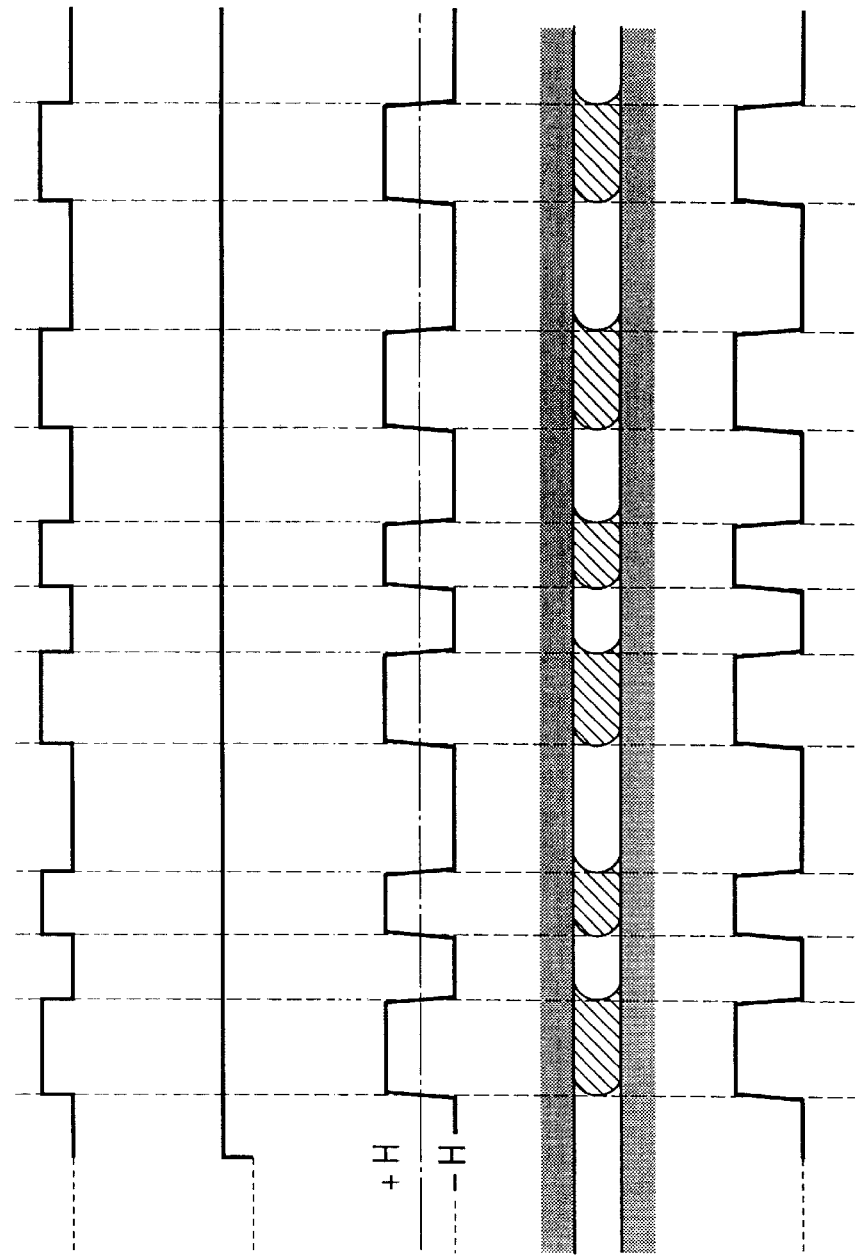
FIGS. 2A, 2B, 2C, 2D and 2E illustrate timing charts for explaining the operation of a conventional magneto-optical recording-reproducing apparatus.
Figure 3:
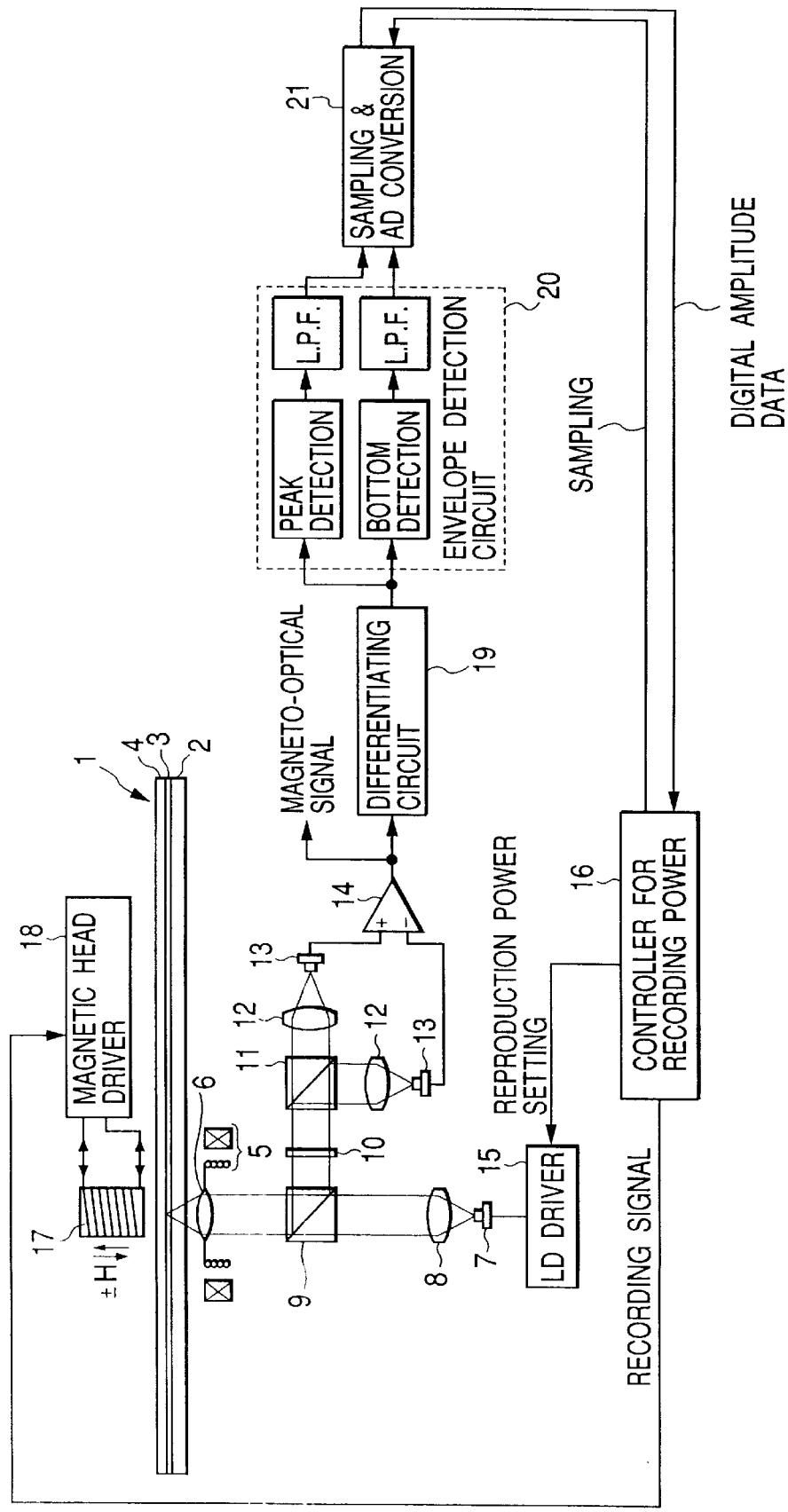
FIG. 3 illustrates the construction of a magneto-optical recording-reproducing apparatus according to the first embodiment of the present invention.

FIG. 3 illustrates the construction of a magneto-optical recording-reproducing apparatus according to the first embodiment of the present invention. In FIG. 3, reference numeral 1 indicates a magneto-optical disk comprising a substrate 2 composed of a glass or plastic material, a-magneto-optical layer 3 formed on the substrate, and a protective layer 4 formed on the magneto-optical layer 3. The magneto-optical layer 3 is capable of reproducing record marks of less than the optical diffraction limit of an optical system by displacing a domain wall of a record mark in a displacement layer without changing record data in a memory layer. This is done by utilizing a temperature gradient-caused by irradiation of a light beam, enlarging magnetization within the light beam-spotted region of the displacement layer, and detecting a change in the polarization direction of reflected light of the light beam. The magneto-optical disk 1 is set to a spindle motor by a magnet chucking or the like, and is so constructed that it is rotatable on an axis of rotation. Reference numerals 5 to 13 indicate individual parts that make up an optical head for irradiating the magneto-optical disk 1 with a laser beam and receiving information from reflected light. Specifically, the optical head comprises a condenser lens 6, an actuator 5 for driving the condenser lens 5, a semiconductor laser 7, a collimator lens 8, a beam splitter 9, a λ/2 plate 10, a polarized light beam splitter 11, photosensors 13 and condenser lenses 12 for the respective photosensors 13.

Reference numeral 14 indicates a differential amplification circuit for differentially amplifying signals condensed and detected in the respective polarization directions. Reference numeral 15 indicates an LD driver 15 which drives the semiconductor laser 7 and controls the recording power and reproduction power.

According to the construction of the above magneto-optical recording-reproducing apparatus, the laser beam emitted from the semiconductor laser 7 is projected onto the magneto-optical disk 1 through the collimator lens 8, the beam splitter 9 and the condenser lens 6. At this time, the condenser lens 6 is controlled so as to move in a focusing direction and a tracking direction under the control of the actuator 5 to successively focus the laser beam on the magneto-optical layer 3. The process is constructed so that it tracks along a guiding groove formed in the magneto-optical disk 1. The laser beam reflected on the magneto-optical disk 1 is deflected by the beam splitter 9 to an optical path toward the polarized light beam splitter 11 and then travels through the λ/2 plate 10 and the polarized light beam splitter 11. Light beams split by the polarized light beam splitter 11 are condensed by the condenser lenses 12 on the respective photosensors 13 in accordance with the magnetization polarity of the magneto-optical layer 3. The outputs from the respective photosensor 13 are differentially amplified by the differential amplification circuit 14 in order to output magneto-optical signals.

A differentiating circuit 19 serves to receive the magneto-optical signals, and produce and output differential signals of the magneto-optical reproduction signals. An envelope detection circuit 20 is a circuit for detecting envelopes of the differential signals of the magneto-optical reproduction signals and is composed of a peak detection circuit, a bottom detection circuit, and two low-pass filters (L.P.F.) for respectively removing high-frequency noises from outputs from both circuits. A sampling and A/D-converting circuit 21 serves to sample at least one sample from peak detection values and bottom detection values in varied reproduction power, on the basis of a sampling-controlling signal from a controller 16, digitizate the sampled value and output the digital data into the controller 16.

The controller 16 receives information on the rotational speed of the magneto-optical disk 1, recording radius, recording sectors, and so forth, and then outputs recording power, recording signals and the like in order to control an LD driver 15, a magnetic head driver 18 and the like. In this embodiment, the controller 16 further plays roles such as control of reproduction power in the reproduction power test, sampling control of amplitude values in the reproduction power test, an averaging processing of digital data in the case where plural samples have been sampled for one reproduction power, and detection of a peak value in the amplitude of differential signals.

Reference numeral 17 indicates a magnetic head for applying a modulation magnetic field to the laser irradiation site on the magneto-optical disk 1 upon the recording operation. The magnetic head 17 is arranged in opposition to the condenser lens 6 with interposition of the magneto-optical disk 1.

Upon recording onto the magneto-optical layer 3, after the magneto-optical disk 1 is set into the magneto-optical recording-reproducing apparatus, the semiconductor laser 7 applies recording laser power as DC light to the magneto-optical disk 1 under the control of the LD driver 15, and synchronously the magnetic head 17 produces magnetic fields of different polarities under the control of the magnetic head driver 18 in accordance with the recording signals. The magnetic head 17 moves with the optical head in a radius direction of the magneto-optical disk 1, and applies a magnetic field successively upon recording onto the laser irradiation site of the magneto-optical layer 3, thereby recording information. In this embodiment, the recording system is described as a magnetic field modulation system. However, the present invention is not limited to this system. Light modulation recording or pulse-assist magnetic field modulation recording may also be used without any problem.

Guiding groove portions formed in the magneto-optical layer 3, between which respective land portions in a recording region have been formed, are preliminarily annealed at a high temperature by irradiating them with a laser beam of high power to modify the portions of the magneto-optical layer 3 corresponding to the guiding groove portions so that domain walls of a record mark will not form a closed loop, or a closed magnetic domain. This treatment permits the displacement of the domain walls at a higher speed and the provision of reproduction signals of high quality.

Figures 5A, 5B, 5C, 5D:
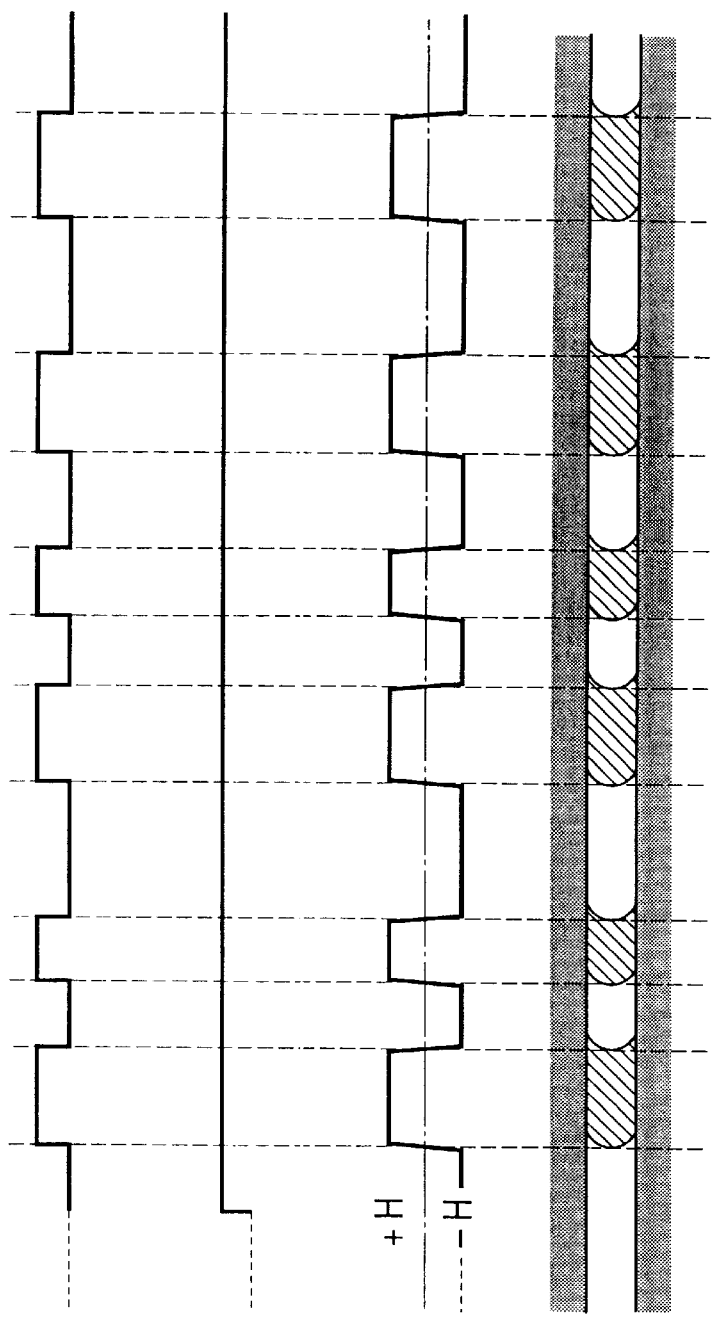
FIGS. 5A, 5B, 5C and 5D illustrate timing charts for explaining the recording operation of the first embodiment of the present invention.

The recording operation in the domain wall displacing medium, on which the present invention is based, will be first described by reference to FIGS. 5A to 5D, in which 5A illustrates recording signals, 5B recording power generated by the semiconductor laser 7, 5C a modulation magnetic field applied by the magnetic head 17, and 5D a record mark sequence recorded on the magneto-optical layer 3. In recording of the recording signals illustrated in FIG. 5A, the laser power of the semiconductor laser 7 is controlled with the start of the recording operation so as to give the prescribed level, as illustrated in FIG. 5B, and the modulation magnetic field, illustrated in FIG. 5C, is applied on the basis of the recording signals, illustrated in FIG. 5A, by the magnetic head 17. By these operations, the record mark sequence illustrated in FIG. 5D, is formed in the course of the cooling of the magneto-optical layer 3. In the record mark sequence, illustrated in FIG. 5D, hatching portions and dotted portions respectively indicate magnetic domains different in magnetizing direction from each other.

The reproducing operation will be described by reference to FIGS. 6A to 6D. In this embodiment, a case is described where the magneto-optical layer 3 has a three-layer structure composed of a memory layer for controlling the storage of record marks, a displacement layer in which domain walls are displaced to directly contribute to reproduction signals, and a switching layer for switching the coupling state between the memory layer and the displacement layer.

Figure 6A:
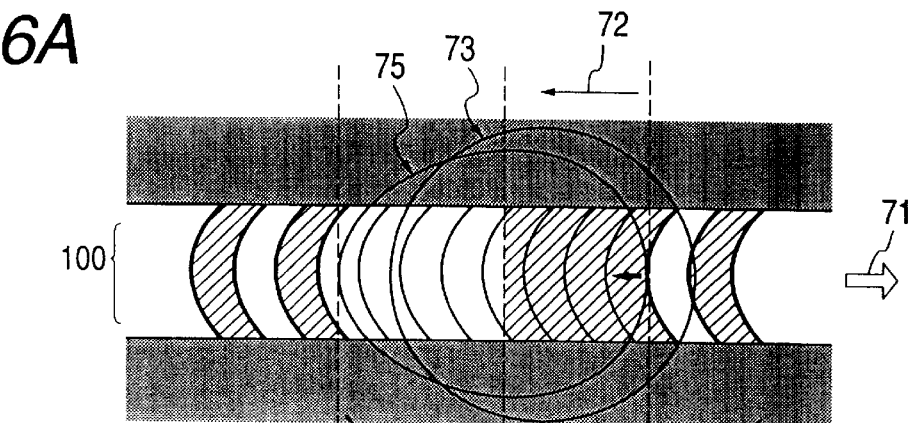
FIGS. 6A, 6B, 6C and 6D illustrate the principle of operation of an embodiment of the present invention.
Figure 6B:
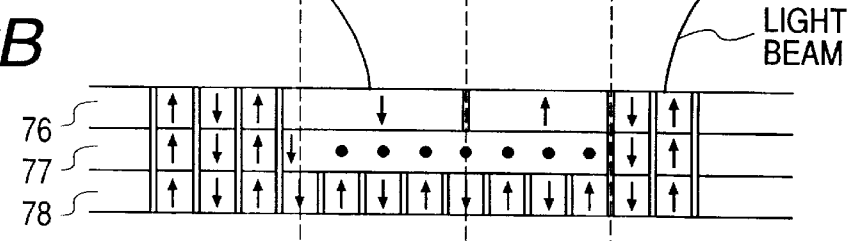
Figure 6C:
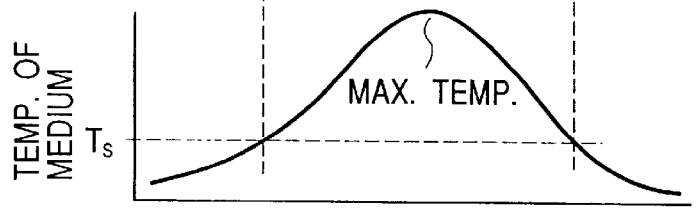
Figure 6D:

FIG. 6A typically illustrates the reproduction state of magnetic domains, FIG. 6B the state of the magneto-optical layer 3, FIG. 6C a state diagram on the temperature of the magneto-optical layer 3, and FIG. 6D reproduction signals. Upon reproduction, the displacement layer of the magneto-optical disk is heated by the irradiation of a light beam, as illustrated in FIG. 6A, up to a temperature Ts at which a domain wall in the displacement layer is displaced. In a temperature region lower than the isothermal temperature Ts, the switching layer, illustrated in FIG. 6B, is in a state coupled with the memory layer and the displacement layer by exchange coupling. When the magneto-optical layer is heated to the temperature Ts at which a domain wall is displaced, or higher by the irradiation of the light beam, the switching layer reaches its Curie temperature, so that the coupling between the displacement layer and the memory layer is broken. Therefore, a domain wall in the displacement layer is momentarily displaced to a position where the domain wall can remain energetically stable relative to the temperature gradient of the displacement layer, namely, to the maximum temperature point in the linear density direction of the temperature rise by the irradiation of the light beam so as to intersect a land. By this displacement, the magnetized state of most of the region covered with the light beam for reproduction becomes the same, so that reproduction signals of a substantially rectangular state, as illustrated in FIG. 6D, can be obtained.

Figure 7:
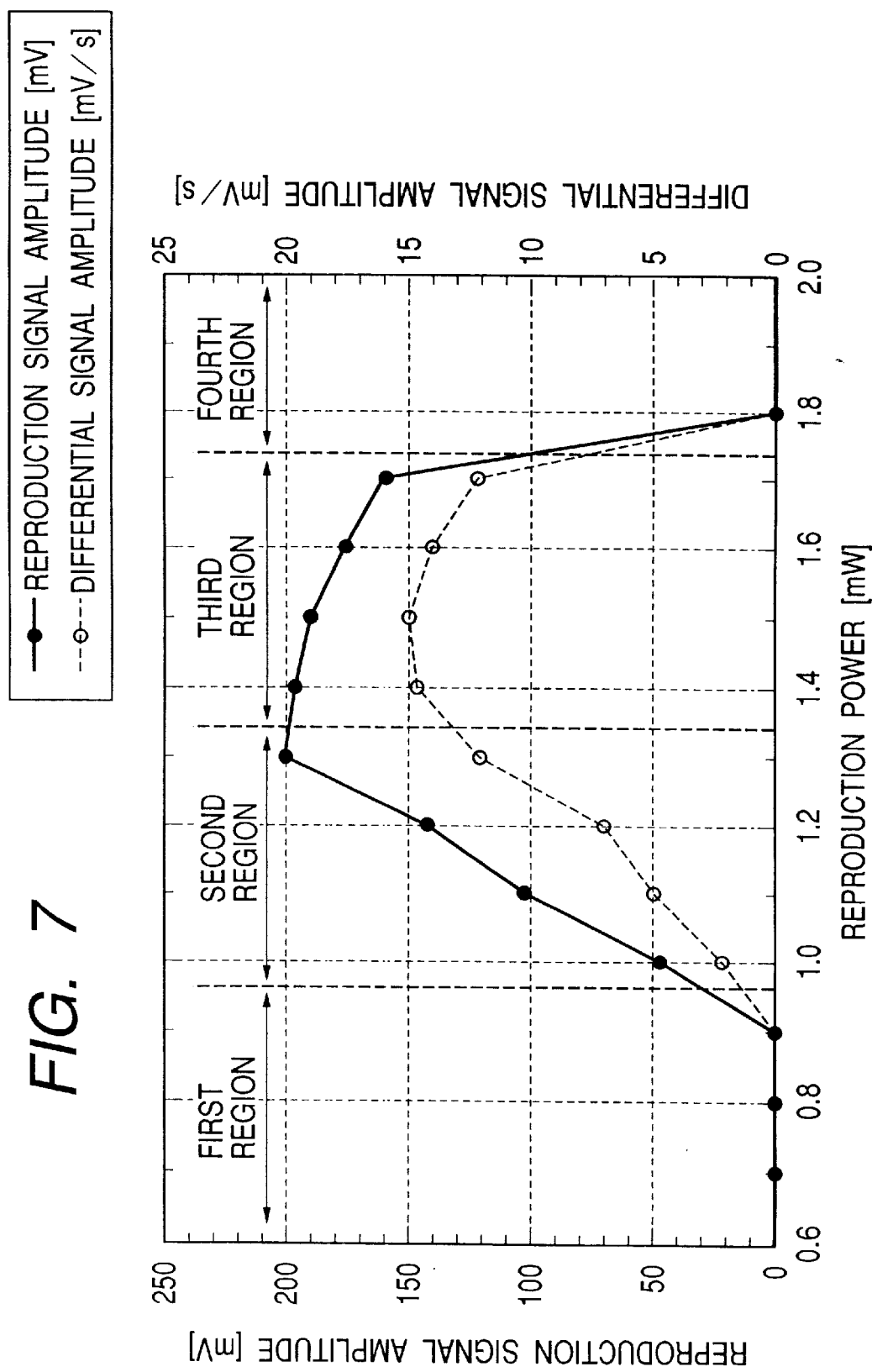
FIG. 7 diagrammatically illustrates an example of the dependence of reproduction signals and differential signals on reproduction power, on which the present invention is based.

In the above-described embodiment, the operation of a reproduction power test according to this embodiment will be described with reference to the construction illustrated in FIG. 3, the timing charts illustrated in FIGS. 4A to 4E, the dependence on the reproduction power illustrated in FIG. 7, and the flow chart illustrated in FIG. 8.

Figure 8:
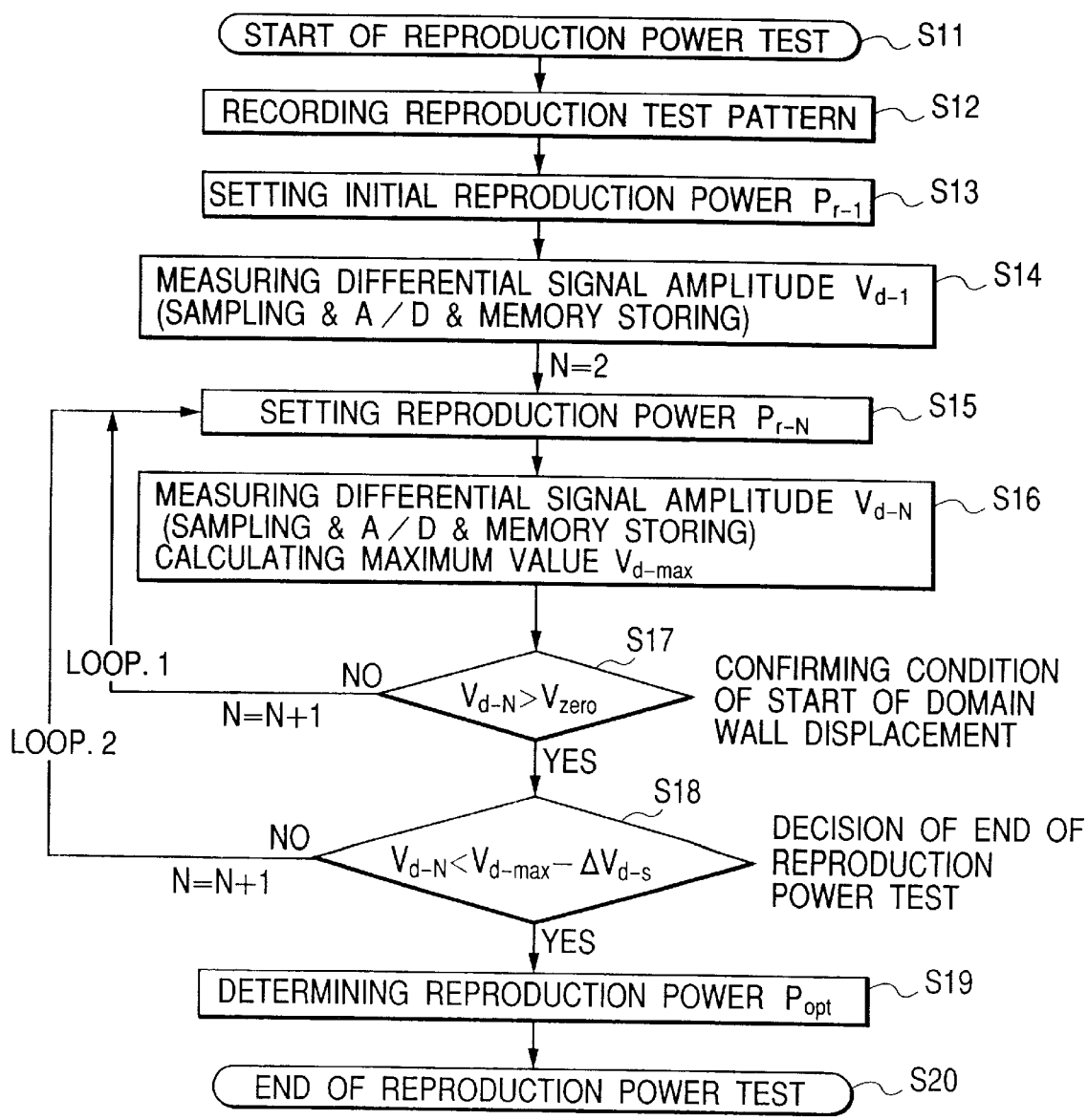
FIG. 8 shows a flow chart for explaining the operation of the first embodiment of the present invention.

In FIG. 8, the test is started from Step S11 to conduct recording in the prescribed region of the reproduction power test in accordance with the recording method described above (S12). The prescribed recording power is used as the recording power for conducting the recording in this step. With respect to the margin of the recording power, a comparatively wide recording power margin can be ensured in the case of the magnetic field modulation recording. Therefore, no particular problem arises so long as the prescribed recording power predetermined according to the linear speed, atmospheric temperature and the like is used. No particular limitation is imposed on a recording pattern recorded. However, it is only necessary to determine a record mark length and the like, in conjunction with an attenuation time constant and the like, related to the envelope detection circuit 20. When a recording pattern of 50% duty is used, however, there is no need to make a characteristic difference between peak detection and bottom detection in the envelope detection, and only a polarity may be converted. In this embodiment, a case is described where tone signals of 50% duty are used. FIG. 4A typically illustrates a recorded pattern. In FIG. 4A, hatching portions and dotted portions respectively indicate magnetic domains magnetized to polarities opposite each other. Both sides of a track, between which a magnetic domain is interposed, are preliminarily annealed at a high temperature by irradiating them with a laser beam of high power in order to modify portions of the recording layer corresponding to these portions, so that domain walls of a record mark will not form a closed loop, or a closed magnetic domain. This treatment permits realizing smooth domain wall displacement.

In this state, the operation of the reproduction power test will be described. FIG. 4B illustrates the state of reproduction power corresponding to the first to third regions in which LD power has been varied by the LD driver 15 in response to controlling signals from the controller 16 (S13). The third region shows an example where the test is conducted at two stages of low reproduction power and high reproduction power within the third region. FIG. 4C illustrates reproduction signals corresponding to the reproduction power. FIG. 4D illustrates differential waveforms of outputs from the differentiating circuit 19 into which the reproduction signals have been inputted. FIG. 4E illustrates envelope waveforms of outputs from the envelope detection circuit 20 for the differential signals (S14). Marks ↑ indicated in the envelope waveforms in FIG. 4E mean sampling points at which the sampling and A/D-converting circuit 21 operates (S14). There is no need to particularly specify the number of samples. However, in this embodiment, two samples are sampled for one laser power, and the values sampled are stored in a memory (S14). The first, second and third regions of the reproduction power, illustrated in FIG. 4B, correspond to the first, second and third regions as to the dependence of the amplitude of signals on reproduction power, as illustrated in FIG. 7, respectively.

When reproduction is first conducted by the reproduction power corresponding to the first region (S15), the magneto-optical layer is not heated to the temperature Ts described in the principle of the reproducing operation described above. Therefore, the coupling between the displacement layer and the memory layer is not broken, and so no displacing phenomenon appears on the domain walls of the displacement layer. For this reason, in the reproduction of minute record marks, no reproduction signal appears due to the resolving power and intercede interference of the optical system, as illustrated in FIG. 4C (S16, S17). Accordingly, a peak value and a bottom value in the envelope detection waveform of the differential signal are almost equal to each other. When these values are sampled and inputted into the controller 16, the controller 16 detects the fact that the reproduction power is in the first region, and further increases the reproduction power to continue the reproduction power test (Loop 1; hereinafter, indications within parentheses correspond to the steps of the flow chart illustrated in FIG. 8).

When the reproduction power test is continued, and the reproduction power reaches a value in the second region (S15), the magneto-optical layer is heated to the temperature Ts, and the switching layer reaches its Curie temperature. Then the coupling between the displacement layer and the memory layer is broken to cause the phenomenon of domain wall displacement. As a result, a reproduction signal starts to appear. Since an isothermal interval is rough in this region, a change in the region of the temperature Ts and a change in the slope of the temperature gradient, at temperatures not lower than the temperature Ts, become greater compared with the change of the reproduction power, and so the rate of domain wall displacement also greatly depends on the reproduction power. Therefore, the amplitude of the reproduction signal, and rise and fall characteristics of polarity change, also greatly depend on the reproduction power. In other words, the dependence of the amplitude ($V_{d-N}$) of differential signals on the reproduction power greatly presents itself (S17). The controller 16 stores the amplitude values detected from the envelopes of the differential signals, compared with the change of the reproduction power, in a memory within the controller 16 to successively detect the maximum amplitude value ($V_{d-max}$) of the differential signals. This is done until this stage is compared with the change of the reproduction power, followed by continuation of the reproduction power test (S18).

When the reproduction power is still further increased to set the third region (S15), the region of the temperature Ts in the magneto-optical layer is enlarged. Since an isothermal interval in the vicinity of the temperature Ts becomes close, however, the degree of enlargement of the region of the temperature Ts becomes low compared with the increase of the reproduction power. The change in the slope of the temperature gradient at temperatures not lower than the temperature Ts also becomes little, so that the rate of domain wall displacement also becomes a substantially saturated state. Therefore, variations in the slopes of rise and fall characteristics of the reproduction signal are also reduced compared with the change of the reproduction power, so that the amplitude values of the differential signals become a substantially saturated state. Since, at this stage, the Kerr rotational angle $\theta_k$ of the reproduction signal is decreased by the temperature rise of the displacement layer attendant on the increase of the reproduction power, the reproduction signal shows a phenomenon that the amplitude attenuates after reaching a maximum value, as indicated by the third region in FIG. 7, though the reproduction power is increased. As described above, the rate of the domain wall displacement is substantially saturated, and so the switching time required for the polarity change of the reproduction signal is substantially saturated, whereas the amplitude of the reproduction signal attenuates. Therefore, the slope of the reproduction signal upon the polarity change becomes gentle. As a result, the amplitude of the differential signals starts to attenuate after showing a maximum value, as indicated by the third region in FIG. 7. The controller 16 stores the amplitude values of the differential signals detected compared with the change of the reproduction power in the memory (S16) to successively calculate the maximum amplitude value, thereby repeatedly comparing it with the amplitude value of the reproduction power as of this time. These sequential measurements are repeated until the amplitude of the differential signal attenuates by the prescribed value ($\Delta V_{d-s}$) compared with the maximum value ($V_{d-max}$) (S17, S18). When the reproduction power reaches the level at which the amplitude of the differential signal attenuates by the prescribed value, the sequential operation, in which the reproduction power is increased, is completed to calculate the reproduction power ($P_{opt}$) at which the differential signal reaches the maximum value (S19). This reproduction power is set to use as the reproduction power for reading out information (Loop 2).

In this embodiment, the record pattern used in the reproduction power test has been described as being recorded each time. However, when a test pattern for reproduction is recorded in advance utilizing the time a magneto-optical disk is initialized or formatted, the reproduction power test can be conducted in a shorter period of time because the latency time between the recording operation and the reproducing operation can be shortened.

In the above-described embodiment, a method has been described in which the waveform of the reproduction signal varies according to the intensity of the reproduction power, and the optimum reproduction power can be set by various factors such as: sensitivity to light, atmospheric temperature and transfer speed (linear speed) relative to the light beam of the recording medium, and the quality of the optical system by which the light beam is formed. This method permits the provision of signals high in reproduction level and quality because magneto-optical signals from the differential amplification circuit 14 are used as reproduction signals after optimum reproduction power is set from the result of the reproduction power test.

Figure 9:
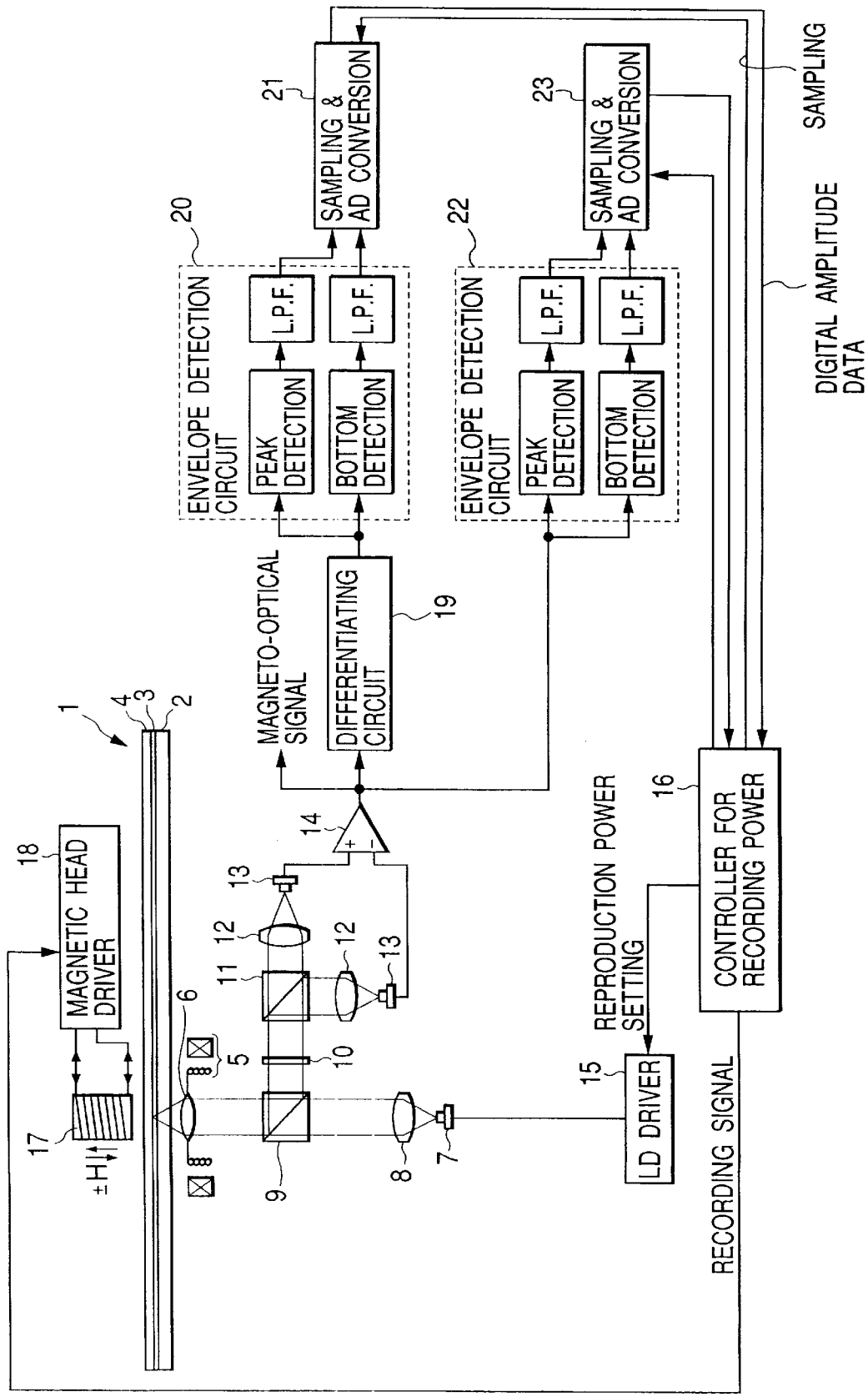
FIG. 9 illustrates the construction of a magneto-optical recording-reproducing apparatus according to a second embodiment of the present invention.

FIG. 9 illustrates the construction of a magneto-optical recording-reproducing apparatus according to the second embodiment of the present invention. In the second embodiment, an envelope detection circuit 22 for detecting envelopes of magneto-optical reproduction signals, and a sampling and A/D-converting circuit 23 for sampling outputs from the envelope detection circuit 22 and subjecting the value sampled to A/D conversion, are added in addition to the constitution of the first embodiment. The other components are the same as those used in the magneto-optical recording reproducing apparatus, illustrated in FIG. 3, and duplicate descriptions are hence omitted. The envelope detection circuit 22 serves to detect the envelopes of the magneto-optical signals themselves and is composed of a peak detection circuit, a bottom detection circuit, and low-pass filters (L.P.F.) for respectively removing high-frequency noises from outputs from both circuits like the envelope detection circuit 20 for the differential signals. The sampling and A/D-converting circuit 23 serves to sample at least one sample from peak detection values and bottom detection values in varied reproduction power on the basis of a sampling controlling signal from the controller 16, digitize the sampled value and output the digital data into the controller 16.

The controller 16 receives information on the rotational speed of the magneto-optical disk 1, recording radius, recording sectors, and so forth, and then outputs recording power, recording signals and the like to control the LD driver 15, the magnetic head driver 18 and the like. In this embodiment, the controller 16 further plays roles such as: control of reproduction power in a reproduction power test, sampling control of amplitude values in the reproduction power test, an averaging processing of digital data in the case where plural samples have been sampled for one reproduction power, detection of a peak value in the amplitude of magneto-optical reproduction signals, and detection of a peak value in the amplitude of differential signals.

Figure 11B:
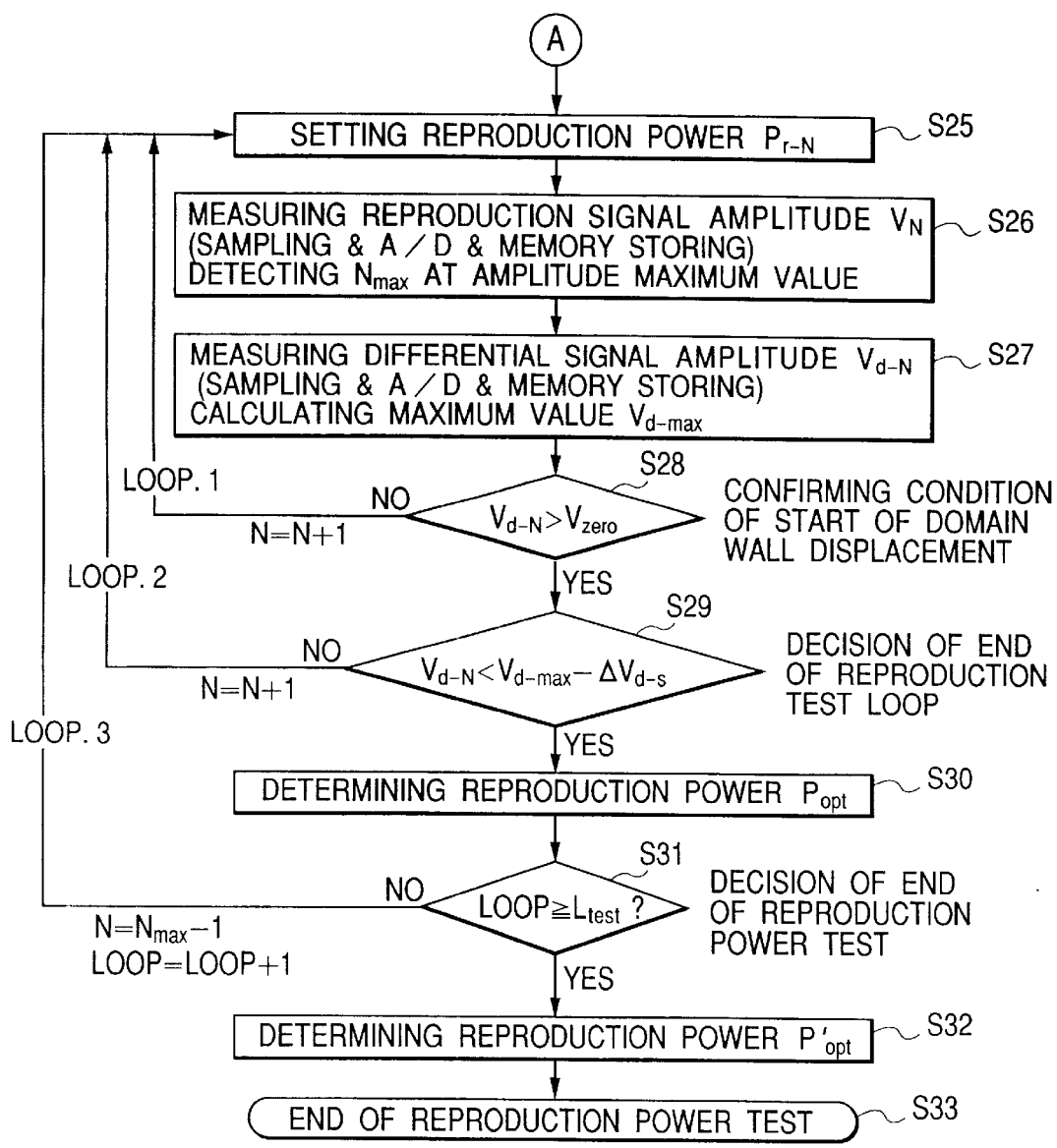
FIG. 11 is comprised of FIG. 11A and FIG. 11B showing a flow chart for explaining the operation of the second embodiment of the present invention.

In the above-described constitution, the operation of a reproduction power test according to this embodiment will be described with reference to the construction illustrated in FIG. 9, the timing charts illustrated in FIGS. 10A to 10F, the dependence on the reproduction power illustrated in FIG. 7, and the flow chart illustrated in FIGS. 11A and 11B.

First of all, recording is conducted in the prescribed region of the reproduction power test in the same manner as in the first embodiment (S21, S22). With respect to the margin of the recording power, a comparatively wide recording power margin can be ensured in the case of the magnetic field modulation recording. Therefore, no particular problem arises so long as the prescribed recording power predetermined according to the linear speed, atmospheric temperature and the like is used.

No particular limitation is imposed on a recording pattern recorded. However, it is only necessary to determine a record mark length and the like in conjunction with attenuation time constants and the like related to the envelope detection circuit 20 and the envelope detection circuit 22. When a recording pattern of 50% duty is used, however, there is no need to make a characteristic difference between peak detection and bottom detection in the envelope detection, and only a polarity may be converted. In this embodiment, a case is described in which tone signals of 50% duty are used. FIG. 10A typically illustrates a recorded pattern. In FIG. 10A, hatching portions and dotted portions respectively indicate magnetic domains magnetized to polarities opposite each other. Both sides of a track, between which a magnetic domain is interposed, are preliminarily annealed at a high temperature by irradiating them with a laser beam of high power in order to modify portions of the recording layer corresponding to these portions, so that domain walls of a record mark will not form a closed loop, or a closed magnetic domain. This treatment permits realizing smooth domain wall displacement.

In this state, the operation of the reproduction power test will be described. FIG. 10B illustrates the state of reproduction power in which LD power has been varied by the LD driver 15 in response to controlling signals from the controller 16 (S23). FIG. 10C illustrates reproduction signals corresponding to the reproduction power. FIG. 10D illustrates envelope waveforms of outputs from the envelope detection circuit 22 for the reproduction signals in the respective regions. FIG. 10E illustrates differential waveforms of outputs from the differentiating circuit 19 into which the reproduction signals have been input. FIG. 10F illustrates envelope waveforms of outputs from the envelope detection circuit 20 for the differential signals (S24). Marks ↑ indicated in the envelope waveforms in FIGS. 10D and 10F mean sampling points at which the sampling and A/D-converting circuits 21 and 23 operate. There is no need to particularly specify the number of samples. However, in this embodiment, two samples are sampled for one laser power. The first, second and third regions of the reproduction power, illustrated in FIG. 10B, correspond to the first, second and third regions as to the dependence of the amplitude of signals on reproduction power, illustrated in FIG. 7, respectively. In the third region, low power and high power within this region are shown in distinction from each other.

When reproduction is first conducted by the reproduction power corresponding to the first region (S25), the magneto-optical layer is not heated to the temperature Ts described in the principle of the reproducing operation described above. Therefore, the coupling between the displacement layer and the memory layer is not broken, and so no displacing phenomenon appears on the domain walls of the displacement layer. For this reason, in reproduction of minute record marks, no reproduction signal appears due to the resolving power and intercode interference of the optical system, as illustrated in FIG. 10C (S26). Accordingly, peak values and bottom values in two envelope detection waveforms of the differential signals are almost equal to each other. When these values are sampled and input into the controller 16, the controller 16 detects the fact that the reproduction power is in the first region, and further increases the reproduction power to continue the reproduction power test (Loop 1; hereinafter, indications within parentheses correspond to the steps of the flow chart illustrated in FIGS. 11A and 11B).

When the reproduction power test is continued, and the reproduction power reaches a value in the second region (S25), the magneto-optical layer is heated to the temperature Ts, and the switching layer reaches its Curie temperature. Then the coupling between the displacement layer and the memory layer is broken to cause the phenomenon of domain wall displacement. As a result, a reproduction signal starts to appear (S26). Since an isothermal interval is rough in this region, a change in the region of the temperature Ts and a change in the slope of the temperature gradient, at temperatures not lower than the temperature Ts, become greater compared with the change of the reproduction power, and so the rate of domain wall displacement also greatly depends on the reproduction power. Therefore, the amplitude of the reproduction signal, and rise and fall characteristics of polarity change, also greatly depend on the reproduction power. In other words, the dependence of the amplitude $(V_N)$ of reproduction signals and the amplitude $(V_{d-N})$ of differential signals on the reproduction power greatly presents itself. The controller 16 stores amplitude values detected from the reproduction signals and the envelopes of the differential signals, compared with the change of the reproduction power, in a memory to successively detect the maximum amplitude value of the reproduction signals and the maximum amplitude value $(V_{d-max})$ of the differential signals. This is done until this stage is compared with the change of the reproduction power, followed by continuation of the reproduction power test.

When the reproduction power is still further increased to reach the third region (S25), the region of the temperature Ts in the magneto-optical layer is enlarged. Since an isothermal interval in the vicinity of the temperature Ts becomes close, however, the degree of enlargement of the region of the temperature Ts becomes low compared with the increase of the reproduction power. The change in the slope of the temperature gradient at temperatures not lower than the temperature Ts also becomes little, so that the rate of domain wall displacement also becomes a substantially saturated state. Therefore, variations in the slopes of rise and fall characteristics of the reproduction signal are also reduced compared with the change of the reproduction power, so that the amplitude value of the differential signal becomes a substantially saturated state. Since, at this stage, the Kerr rotational angle $\theta_k$ of the reproduction signal is decreased by the temperature rise of the displacement layer attendant on the increase of the reproduction power, the reproduction signal shows a phenomenon that the amplitude attenuates after reaching a maximum value, as indicated by the third region in FIG. 7, though the reproduction power is increased. At this point of time, the controller 16 detects the reproduction power at which the reproduction signal reaches the maximum value, and stores this information $(N_{max})$ in the memory (S26). As described above, the rate of the domain wall displacement is substantially saturated, and so the switching time required for the polarity change of the reproduction signal is substantially saturated, whereas the amplitude of the reproduction signal attenuates. Therefore, the slope of the reproduction signal upon the polarity change becomes gentle. As a result, the amplitude of the differential signals starts to attenuate after showing a maximum value, as indicated by the third region in FIG. 7. The controller 16 stores the amplitude values of the differential signals detected compared with the change of the reproduction power in the memory (S27) to successively calculate the maximum amplitude value, thereby repeatedly comparing it with the amplitude value of the reproduction power as of this time. These sequential measurements are repeated until the amplitude of the differential signal attenuates by the prescribed value $(\Delta V_{d-s})$ compared with the maximum value $(V_{d-max})$ (S28, S29). When the reproduction power reaches the level at which the amplitude of the differential signal attenuates by the prescribed value, the sequential operation, in which the reproduction power is increased, is completed to calculate the reproduction power $(P_{opt})$ at which the differential signal reaches the maximum value (S30), and this reproduction power is stored in memory (Loop 2).

In this embodiment, the reproduction power is further reduced to reproduction power $(N_{max-1})$ before one step of the reproduction power, at which the amplitude of the differential signal reaches the maximum value (S31), to repeat the same measurement as described above (Loop 3).

This operation is repeated the specified number of times ($L_{test}$) to calculate an average value of the reproduction power ($P_{opt}$) determined by the respective measurements as the final reproduction power ($P'_{opt}$), whereby the reproduction power can be set with higher precision. The number of times ($L_{test}$) of the repetition may be determined according to the precision required and the reproduction power-testing time.

In this embodiment, the record pattern used in the reproduction power test has been described as being recorded each time. However, when a test pattern for reproduction is recorded in advance utilizing the time a magneto-optical disk is initialized or formatted, the reproduction power test can be conducted in a shorter period of time because the latency time from the recording operation to the reproducing operation can be shortened.

In the above-described embodiment, a method has been described in which the detection of the amplitude of the reproduction signals by the intensity of the reproduction power can be conducted with precision, and reproduction power more optimum than the first embodiment can be set by various factors such as: sensitivity to light, atmospheric temperature and transfer speed (linear speed) relative to the light beam of the recording medium, and the quality of the optical system by which the light beam is formed. This method permits the provision of signals high in reproduction level and quality, since after setting the optimum reproduction power ($P_{opt}$), magneto-optical signals from the differential amplification circuit 14 are used as reproduction signals based on the output level of the semiconductor laser at this time.

Figure 12:
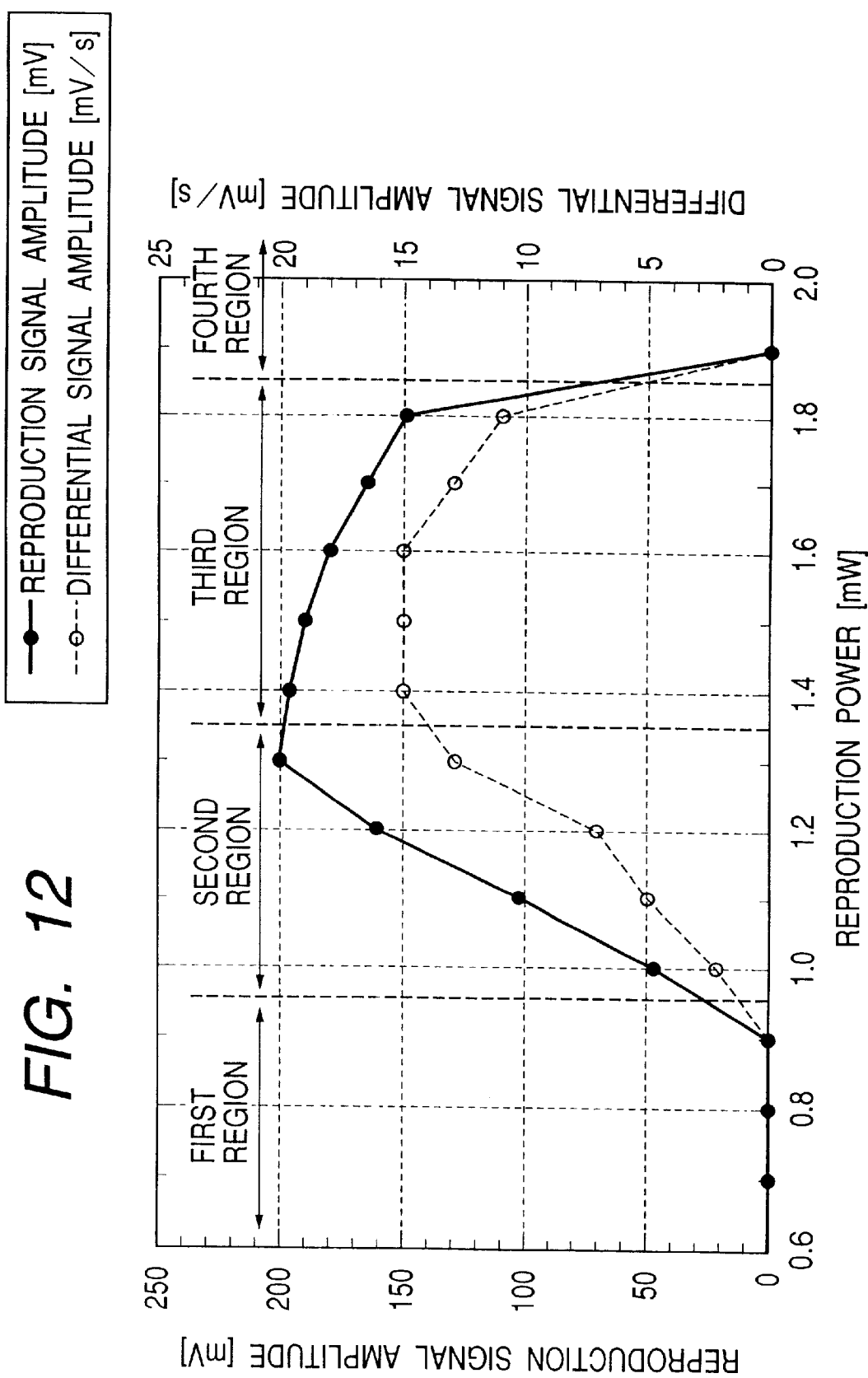
FIG. 12 diagrammatically illustrates another example of the dependence of reproduction signals and differential signals on reproduction power, on which the present invention is based.

A third embodiment of the present invention will hereinafter be described. The construction of the apparatus used in this embodiment is the same as in the construction of the apparatus used in the second embodiment, and so its description is omitted. The third embodiment describes the operation of a reproduction power test in a case where reproduction power, at which the amplitude of the differential signal reaches the maximum value, cannot be specified from the viewpoint of detective resolving power. This is the case since amplitude values of differential signals are almost equal in a certain reproduction power region in the dependence of the amplitude of differential signals on the reproduction power, as indicated by the third region in FIG. 12. The reason why a difference arises in such dependence of differential signals on the reproduction power, as illustrated in FIGS. 7 and 12, is that the dependence depends on the design of magnetic films, the temperature distribution of a light beam-irradiation site of a recording medium tested, and the like. This embodiment is characterized in that, in such a case, a reproduction power value closest to the reproduction power at which the amplitude of the reproduction signal reaches the maximum value, is used as the reproduction power from among the reproduction power values at which the amplitude of the differential signals reaches the maximum value. This has an effect that S/N can be improved by making the level of reproduction signals as great as possible to relatively lower the influence of noises from a reproducing process system when the system of the reproducing process system is taken into consideration in addition to the rate of domain wall displacement.

Figure 14B:
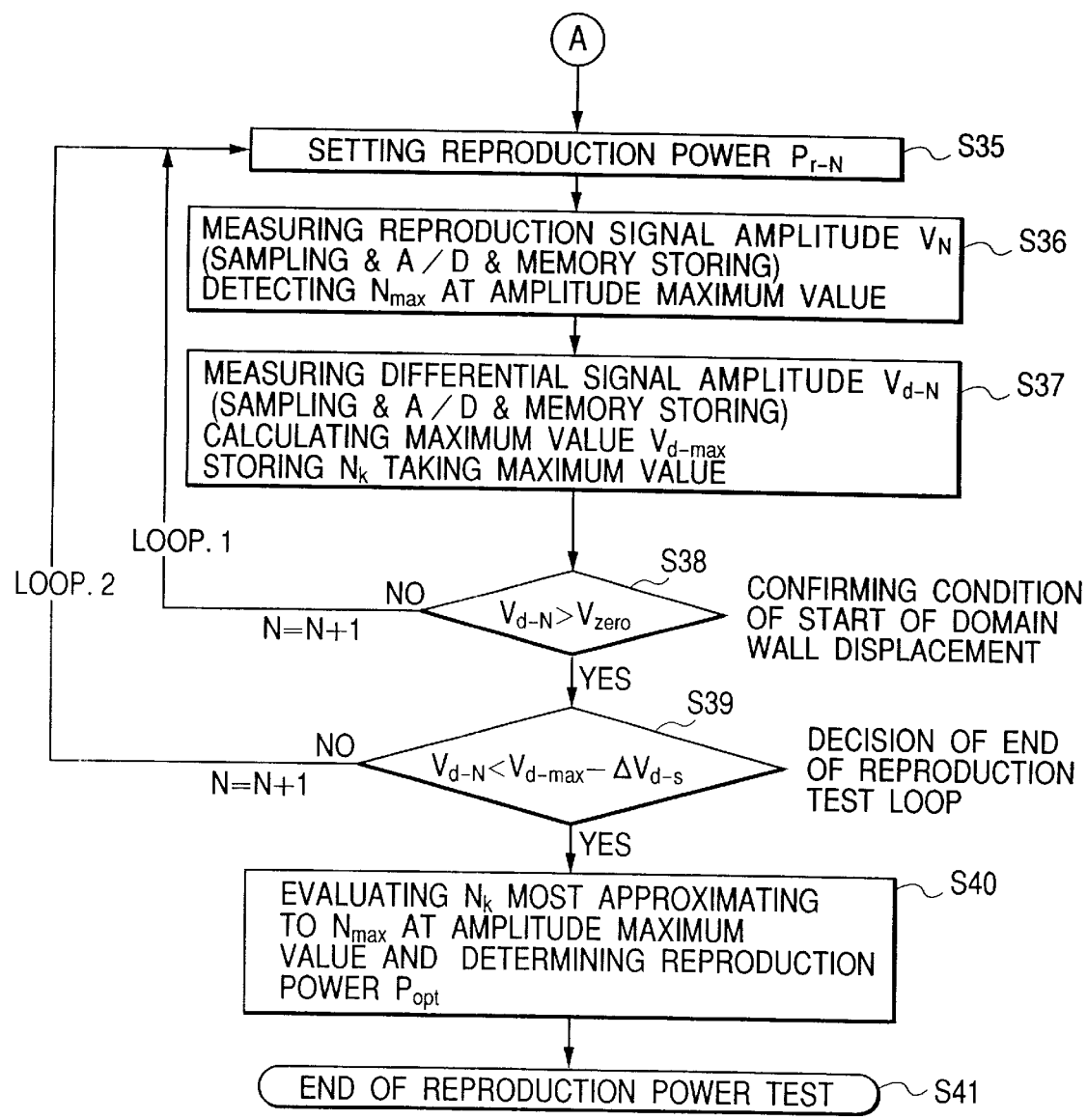
FIG. 14 is comprised of FIG. 14A and FIG. 14B showing a flow chart for explaining the operation of the third embodiment of the present invention.

The operation of a reproduction power test according to this embodiment will hereinafter be described with reference to the construction illustrated in FIG. 9, the dependence on the reproduction power illustrated in FIG. 12, the timing charts illustrated in FIGS. 13A to 13F, and the flow charts illustrated in FIGS. 14A and 14B.

First of all, recording is conducted in the prescribed region of the reproduction power test in the same manner as in the first and second embodiments (S31, S32). With respect to the margin of the recording power, a comparatively wide recording power margin can be ensured in the case of magnetic field modulation recording. Therefore, no particular problem arises so long as the prescribed recording power predetermined according to the linear speed, atmospheric temperature and the like is used.

No particular limitation is imposed on a recording pattern recorded. However, it is only necessary to determine a record mark length and the like in conjunction with attenuation time constants and the like related to the envelope detection circuit 20 and the envelope detection circuit 22. When a recording pattern of 50% duty is used, however, there is no need to make a characteristic difference between peak detection and bottom detection in the envelope detection, and only a polarity may be converted. In this embodiment, a case is described where tone signals of 50% duty are used. FIG. 13A typically illustrates a recorded pattern. In FIG. 13A, hatching portions and dotted portions respectively indicate magnetic domains magnetized to polarities opposite each other. Both sides of a track, between which a magnetic domain is interposed, are preliminarily annealed at a high temperature by irradiating them with a laser beam of high power in order to modify portions of the recording layer corresponding to these portions so that domain walls of a record mark will not form a closed loop, or a closed magnetic domain. This treatment permits realizing smooth domain wall displacement.

In this state, the operation of the reproduction power test will be described. FIG. 13B illustrates the state of reproduction power in which LD power has been varied by the LD driver 15 in response to controlling signals from the controller 16 (S33, S35). FIG. 13C illustrates reproduction signals corresponding to the reproduction power. FIG. 13D illustrates envelope waveforms of outputs from the envelope detection circuit 22 for the reproduction signals in the respective regions. FIG. 13E illustrates differential waveforms of outputs from the differentiating circuit 19 into which the reproduction signals have been input. FIG. 13F illustrates envelope waveforms of outputs from the envelope detection circuit 20 for the differential signals. Marks ↑ indicated in the envelope waveforms in FIGS. 13D and 13F mean sampling points at which the sampling and A/D-converting circuits 21 and 23 operate. There is no need to particularly specify the number of samples. However, in this embodiment, two samples are sampled for one laser power. The first, second and third regions of the reproduction power, illustrated in FIG. 13B, correspond to the first, second and third regions as to the dependence of the amplitude of signals on reproduction power, illustrated in FIG. 12, respectively.

When reproduction is first conducted by the reproduction power corresponding to the first region (S35), the magneto-optical layer is not heated to the temperature Ts described in the principle of the reproducing operation described above. Therefore, the coupling between the displacement layer and the memory layer is not broken, and so no displacing phenomenon appears on the domain walls of the displacement layer (S36). For this reason, in reproduction of minute record marks, no reproduction signal appears due to the resolving power and intercode interference of the optical system, as illustrated in FIG. 13C. Accordingly, peak values and bottom values in the envelope detection waveforms of the differential signals are almost equal to each other. When these values are sampled and input into the controller 16, the controller 16 detects the fact that the reproduction power is in the first region (S38), and further increases the reproduction power to continue the reproduction power test (Loop 1; hereinafter, indications within parentheses correspond to the steps of the flow charts illustrated in FIGS. 14A and 14B).

When the reproduction power test is continued, and the reproduction power reaches a value in the second region (S35), the magneto-optical layer is heated to the temperature Ts, and the switching layer reaches its Curie temperature. Then the coupling between the displacement layer and the memory layer is broken to cause the phenomenon of domain wall displacement. As a result, a reproduction signal starts to appear (S36). Since an isothermal interval is rough in this region, a change in the region of the temperature Ts and a change in the slope of the temperature gradient, at temperatures not lower than the temperature Ts, become greater compared with the change of the reproduction power, and so the rate of domain wall displacement also greatly depends on the reproduction power. Therefore, the amplitude of the reproduction signal, and rise and fall characteristics of polarity change, also greatly depend on the reproduction power. In other words, the dependence of the amplitude ($V_N$) of reproduction signals and the amplitude ($V_{d-N}$) of differential signals on the reproduction power greatly presents itself. The controller 16 stores amplitude values detected from the reproduction signals and the envelopes of the differential signals, compared with the change of the reproduction power, in a memory to successively detect the maximum amplitude value of the reproduction signals and the maximum amplitude value ($V_{d-max}$) of the differential signals. This is done until this stage compared with the change of the reproduction power (S37), followed by continuation of the reproduction power test.

When the reproduction power is still further increased to reach the third region (S35), the region of the temperature Ts in the magneto-optical layer is enlarged. Since an isothermal interval in the vicinity of the temperature Ts becomes close, however, the degree of enlargement of the region of the temperature Ts becomes low compared with the increase of the reproduction power. The change in the slope of the temperature gradient at temperatures not lower than the temperature Ts also becomes little, so that the rate of domain wall displacement also becomes a substantially saturated state. Since, at this stage, the Kerr rotational angle $\theta_k$ of the reproduction signal is decreased by the temperature rise of the displacement layer attendant on the increase of the reproduction power, the reproduction signal shows a phenomenon that the amplitude attenuates after reaching a maximum value, as indicated by the third region in FIG. 12, though the reproduction power is increased. At this point of time, the controller 16 detects the reproduction power at which the reproduction signal reaches the maximum value, and stores this information ($N_{max}$) in the memory (S36). Therefore, the amplitude values of the differential signals become a saturated state due to the interaction between the attenuated amplitude of the reproduction signals and the increased rate of domain wall displacement, so that the amplitude of the differential signals comes into a state that it undergoes no change even when the reproduction power is varied. In other words, the rate of the domain wall displacement is increased a little, and so the switching time required for the polarity change of the reproduction signal is shortened, whereas the amplitude of the reproduction signal attenuates. Therefore, the slope of the reproduction signal upon the polarity change becomes fixed. As a result, the amplitude of the differential signals retains its maximum value over a certain region of the reproduction power, as indicated by the third region in FIG. 12. The controller 16 stores the amplitude values of the differential signals detected, compared with the change of the reproduction power, in memory to successively calculate the maximum amplitude value (S37). In this case, the reproduction power at which the amplitude reaches the maximum value cannot be determined unqualifiedly. Therefore, the controller 16 is preset so as to store the reproduction power values at which the amplitude reaches the maximum value, namely, plural $N_k$ values. The number of values stored is desirably determined according to the increase in the reproduction power and the width of the third region. The maximum differential signal value calculated is compared repeatedly with the amplitude value of the differential signal of the reproduction power as of this time to repeat these sequential measurements until the amplitude of the differential signal attenuates by the prescribed value ($\Delta V_{d-s}$) compared with the maximum value ($V_{d-max}$) (S39) (Loop 2).

When the reproduction power reaches the level at which the amplitude of the differential signal attenuates by the prescribed value, the sequential operation, in which the reproduction power is increased, is completed (S39). At this point in time, an $N_k$ closest to the $N_{max}$, at which the amplitude value of the reproduction signal shows the maximum value, is determined from among the $N_k$ group in which the differential signals show the maximum value, to calculate a reproduction power value ($P_{opt}$) at this time (S40). This reproduction power is determined as the final reproduction power for reading out information to complete the reproduction power test (S41).

In this embodiment, the record pattern used in the reproduction power test has been described as being recorded each time. However, when a test pattern for reproduction is recorded in advance, utilizing the time a magneto-optical disk is initialized or formatted, the reproduction power test can be conducted in a shorter period of time because the latency time between the recording operation and the reproducing operation can be shortened.

According to this embodiment, S/N can be improved by making the level of reproduction signals as great as possible to relatively lower the influence of noises from a reproducing process system when the system of the reproducing process system is taken into consideration in addition to the rate of domain wall displacement.

What is claimed is:

1. A magneto-optical reproducing method wherein information recorded on a recording medium is reproduced by displacing a domain wall, the method comprising the steps of:
   reproducing prescribed record signals recorded in the recording medium by plural stages of reproduction power to detect reproduction signals;
   differentiating reproduction signals detected in said reproducing step to detect differential signals; and
   determining a reproduction power on the basis of amplitude values of the differential signals.

2. The method according to claim 1, wherein in said determining step, a reproduction power at which an amplitude value reaches a maximum value is determined as said reproduction power.

3. The method according to claim 1, wherein detection of said amplitude values is conducted by sampling envelope detection signals of said differential signals.

4. The method according to claim 1, wherein said reproducing, differentiating and determining steps are conducted with respect to prescribed regions of the recording medium.

5. The method according to claim 2, wherein in said determining step, reproduction power at which amplitude values of the differential signals reach a maximum value is detected repeatedly plural times, and an average value of the reproduction power detected by respective measurements is determined as a final reproduction power.

6. The method according to claim 2, wherein in said determining step, a reproduction power closest to the reproduction power at which the amplitude of the reproduction signal reaches the maximum value is determined as a final reproduction power among reproduction power values at which the amplitude of the differential signals reaches a maximum value.

7. A magneto-optical reproducing apparatus wherein information recorded on a recording medium is reproduced by displacing a domain wall, the apparatus comprising:

means for reproducing prescribed record signals recorded in the recording medium by plural stages of reproduction power to detect reproduction signals;

means for differentiating reproduction signals to detect differential signals; and means for determining a reproduction power on the basis of amplitude values of the differential signals.

* * * * *

UNITED STATES PATENT AND TRADEMARK OFFICE
CERTIFICATE OF CORRECTION

PATENT NO.    : 6,246,641 B1
DATED         : June 12, 2001
INVENTOR(S)   : Yasuyuki Miyaoka It is certified that error appears in the above-identified patent and that said Letters Patent is hereby corrected as shown below:

Column 2,
Line 28, "lens 5," should read -- lens 6, --.

Column 7,
Line 7, "gradient-caused" should read -- gradient caused --;
Line 18, "lens 5," should read -- lens 6, --; and
Line 62, "digitizate" should read -- digitize --.

Column 18,
Line 9, "NK" should read -- $N_k$ --.

Signed and Sealed this

Twenty-sixth Day of March, 2002

Attest:

*Attesting Officer*

JAMES E. ROGAN
*Director of the United States Patent and Trademark Office*